US012293555B2

(12) United States Patent
Kim et al.

(10) Patent No.: US 12,293,555 B2
(45) Date of Patent: May 6, 2025

(54) METHOD AND DEVICE OF INPUTTING ANNOTATION OF OBJECT BOUNDARY INFORMATION

(71) Applicant: SELECT STAR, INC., Daejeon (KR)

(72) Inventors: Nam Gil Kim, Bucheon-si (KR); Barom Kang, Seoul (KR)

(73) Assignee: SELECT STAR, INC., Daejeon (KR)

( * ) Notice: Subject to any disclaimer, the term of this patent is extended or adjusted under 35 U.S.C. 154(b) by 330 days.

(21) Appl. No.: 17/676,583

(22) Filed: Feb. 21, 2022

(65) Prior Publication Data

US 2022/0270341 A1   Aug. 25, 2022

(30) Foreign Application Priority Data

Jan. 13, 2021   (KR) .................. 10-2021-0004653
Feb. 19, 2021   (KR) .................. 10-2021-0022841

(51) Int. Cl.
*G06V 10/22*   (2022.01)
*G06V 10/26*   (2022.01)
*G06V 10/82*   (2022.01)
*G06V 20/40*   (2022.01)

(52) U.S. Cl.
CPC ............ *G06V 10/235* (2022.01); *G06V 10/26* (2022.01); *G06V 10/82* (2022.01); *G06V 20/41* (2022.01)

(58) Field of Classification Search
CPC .. G06V 10/235; G06V 10/26; G06V 10/7788; G06V 10/82; G06V 20/41
See application file for complete search history.

(56) References Cited

U.S. PATENT DOCUMENTS

| 11,568,627 B2 * | 1/2023 | Price ...................... G06V 10/26 |
| 2020/0196015 A1 * | 6/2020 | Pate ........................ G06V 10/82 |
| 2020/0226474 A1 | 7/2020 | Fidler et al. |
| 2023/0022554 A1 * | 1/2023 | Peterson .............. A61B 5/6898 |

FOREIGN PATENT DOCUMENTS

KR   1020180081353   7/2018

OTHER PUBLICATIONS

"Office Action for Korean Patent Application No. 10-2021-0022841, dated May 23, 2021".
"Office Action for Korean Patent Application No. 10-2021-0022841, dated Aug. 25, 2021".

* cited by examiner

*Primary Examiner* — Michael J Vanchy, Jr.

(57) ABSTRACT

The present invention relates to a method and a device of inputting annotation of object boundary information, and more particularly, to a method and a device of inputting annotation of object boundary information such that workers or the like efficiently and accurately input object boundary information in a service such as crowding sourcing, and preliminary work is assisted by an artificial neural network-based algorithm.

7 Claims, 39 Drawing Sheets

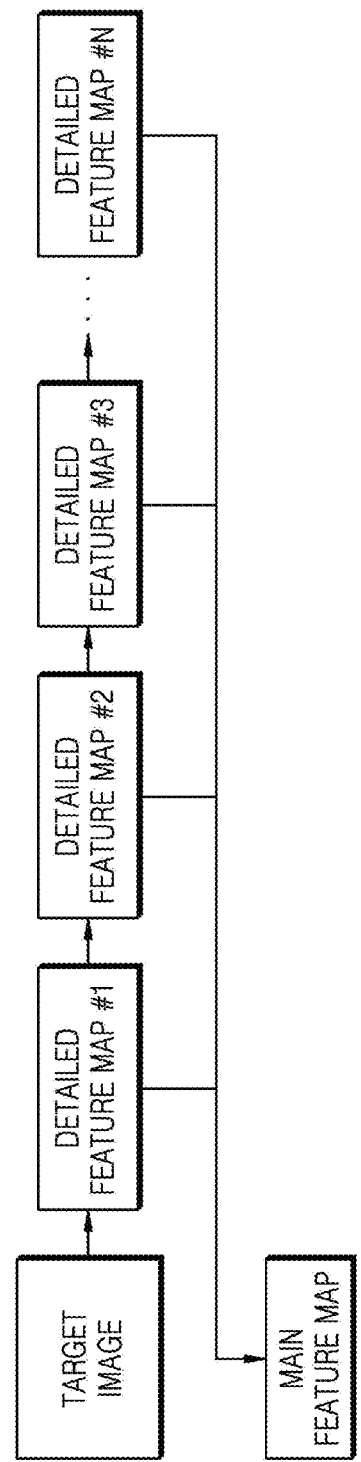

CONNECTION
SEQUENCE
CHANGE UNIT

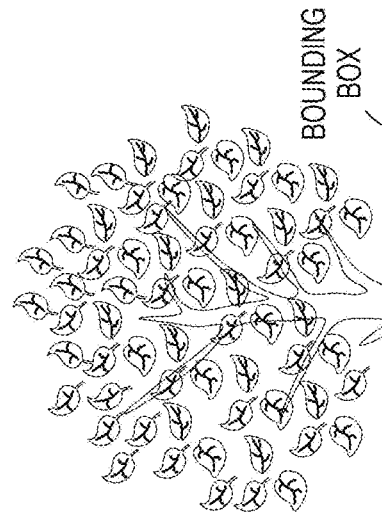
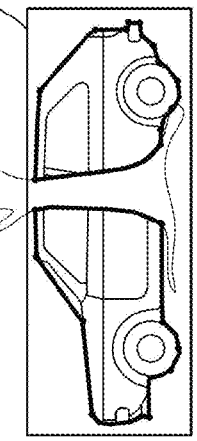
FIG. 22A
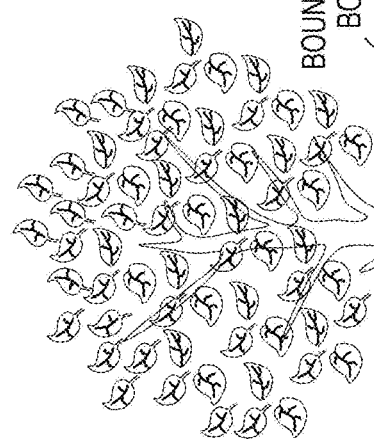
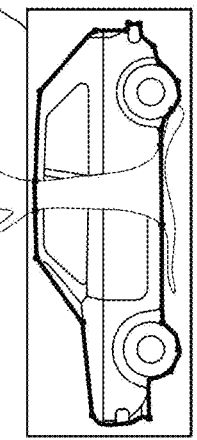
FIG. 22B
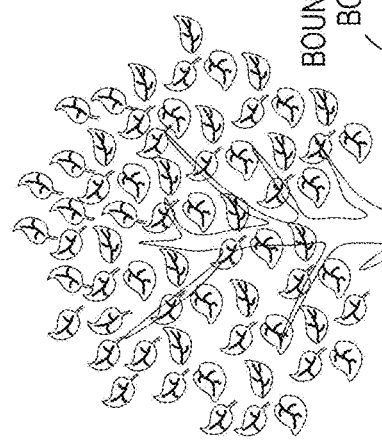
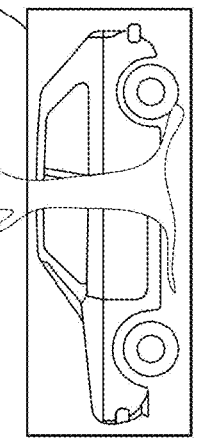
FIG. 22C

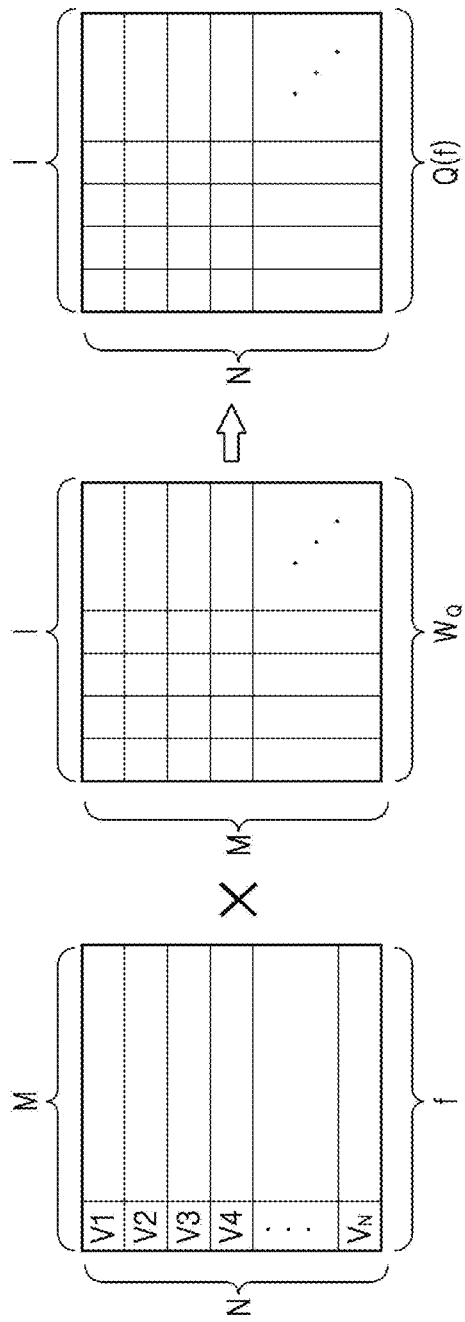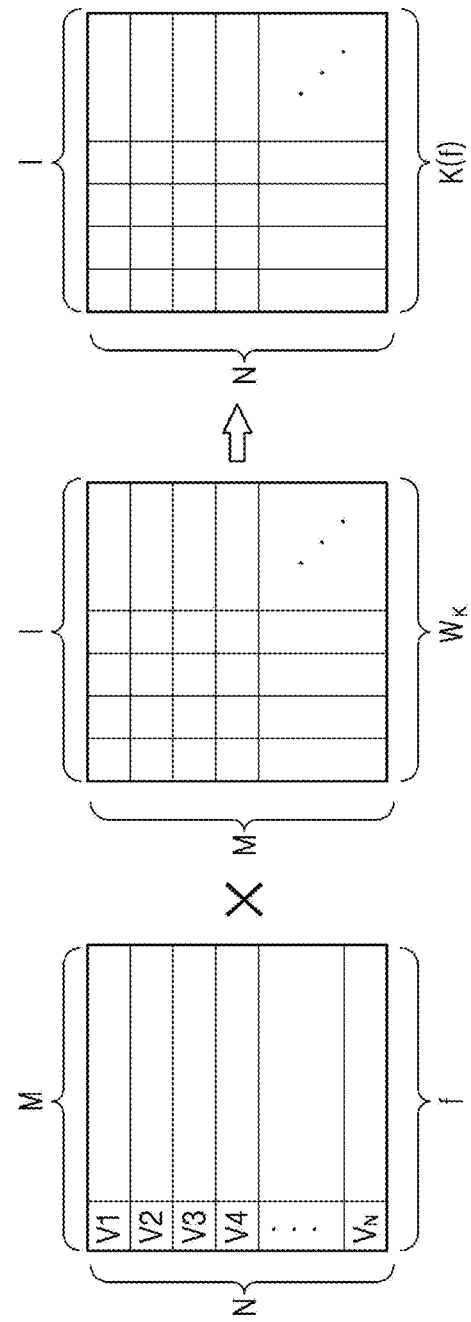

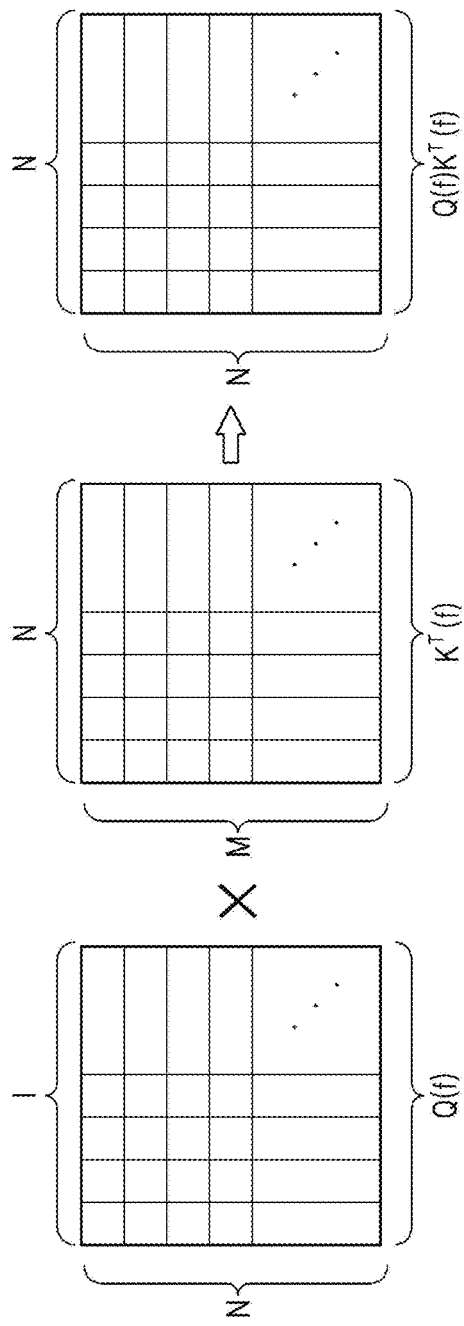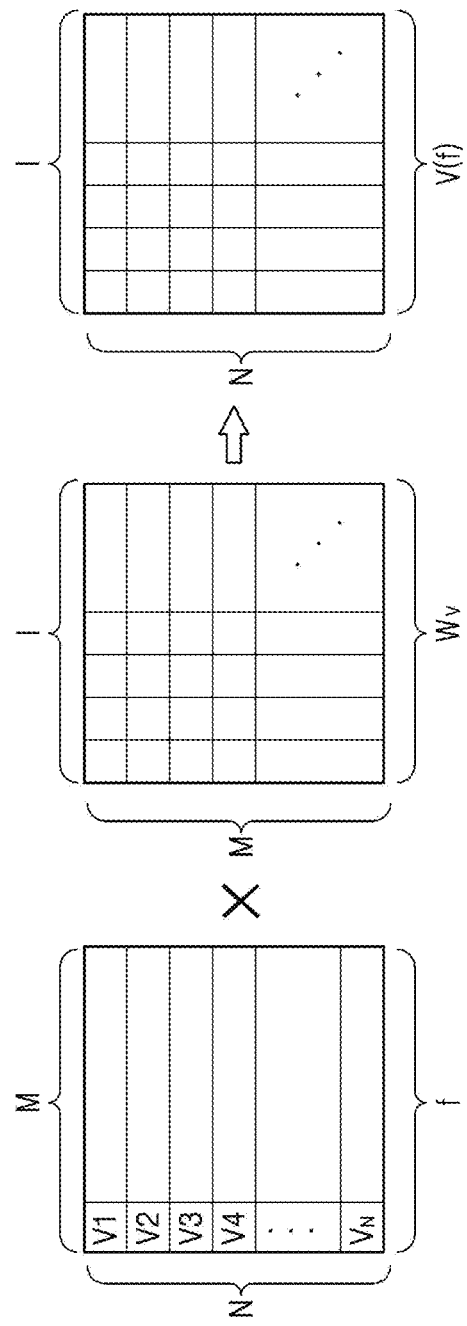

FIG. 27

$$\text{Sftmax}\left(\frac{Q(f) K^T(f)}{\sqrt{d_K}}\right) V(f)$$

|    | V1  | V2  | V3  | V4  | V5  |
|----|-----|-----|-----|-----|-----|
| V1 | 1   | 0.8 | 0.7 | 0.3 | 0.2 |
| V2 | 0.8 | 1   | 0.8 | 0.4 | 0.3 |
| V3 | 0.7 | 0.8 | 1   | 0.9 | 0.2 |
| V4 | 0.3 | 0.4 | 0.9 | 1   | 0.3 |
| V5 | 0.2 | 0.3 | 0.2 | 0.3 | 1   |

METHOD AND DEVICE OF INPUTTING ANNOTATION OF OBJECT BOUNDARY INFORMATION

BACKGROUND OF THE INVENTION

1. Field of the Invention

The present invention relates to a method and a device of inputting annotation of object boundary information, and more particularly, to a method and a device of inputting annotation of object boundary information such that workers or the like efficiently and accurately input object boundary information in a service such as crowding sourcing, and preliminary work is assisted by an artificial neural network-based algorithm.

2. Description of the Related Art

Recently, as technologies related to artificial intelligence have been developed and various solutions using the artificial intelligence have been developed, interest in methods of collecting or building data for learning artificial intelligence is increasing. Since the artificial intelligence, especially deep learning-based artificial intelligence has the better performance when the amount of data for learning is greater and the quality of the data is higher, it is increasingly important to ensure high-quality data rather than simply ensuring data for learning.

In general, in the case of data for training artificial intelligence, labeled data, such as separately labeling vehicle areas in an image containing vehicles, is required. Accordingly, it is necessary to separately label the collected data through manual work and the like in addition to simply collecting data, and this requires a lot of resources, such as securing human power for performing labeling and time requirement for the labeling, in securing learning data.

Thus, methods for building data based on crowd sourcing have been proposed recently in order to efficiently secure a large amount of labeled training data. According to the crowd sourcing, work such as data is provided to an unspecified number of workers, the workers perform a job such as labeling on the work, work results performed by the workers are inspected by multiple inspectors, pieces of labeled data are finally established, and the workers having labeled the corresponding data are rewarded with respect to the data finally established through the inspection.

Meanwhile, recently, data-based deep learning technology exhibits the outstanding ability in object segmentation in various fields. The object segmentation work corresponds to the work of dividing an object of a pixel unit into a given class, and the object segmentation work basically requires the work of separating an outline of an object in an image. The above object segmentation work is required to be performed in consideration of scale variability, overlap/occlusion, and motion blur. In order to improve the performance of artificial neural network-based operation in the above object segmentation work, an artificial neural network is required to be trained by a large amount of labeled data or annotated data.

However, it takes a lot of time and money to obtain training data of the artificial neural network that performs the object segmentation. In general, when an object is detected in one image and an annotation (for example, the work of extracting an outline of a specific object from the image) is performed, it takes 40 seconds on average.

A scribble or click type has been proposed for annotating images. The scribble type corresponds to drawing a line on an object area by a user, and the click type is similar to the scribble type but corresponds to performing a click on the object area.

In regard to the above types, there is a limitation in expressing an object partially obscured by another object. In addition, basically, it takes a lot of time for a human to manually annotate the object.

SUMMARY OF THE INVENTION

The present invention relates to a method and a device of inputting annotation of object boundary information, and more particularly, the present invention provides a method and a device of inputting annotation of object boundary information such that workers or the like efficiently and accurately input object boundary information in a service such as crowding sourcing, and preliminary work is assisted by an artificial neural network-based algorithm.

In order to solve the above problem, one embodiment of the present invention provides a method, which is executed in a computing system including at least one processor and at least one memory, of inputting annotation of object boundary information, the method including: a bounding information input step of receiving information on a bounding box inside the image from a user; a first prediction control point extraction step of extracting a plurality of control points related to a predicted object boundary from an image inside the bounding box by using a learned artificial neural network model; a predicted control point display step of overlaying and displaying the predicted control points on the image inside the bounding box in a form of having reciprocal connection sequences; and a change input reception step of receiving a position change input for at least one of the control points from the user.

According to one embodiment of the present invention, the method of inputting annotation of object boundary information for an image may further include: a second prediction control point extraction step of extracting a plurality of control points related to the predicted object boundary from an image inside the bounding box by using a learned artificial neural network model while additionally considering the position change input.

According to one embodiment of the present invention, the first predicted control point extraction step may include modifying positions of the control points so that the control points are close to the object boundary by inputting the feature map information extracted for each pixel or pixel group of the image inside the bounding box into the learned control point adjustment artificial neural network model, with respect to a plurality of control points having initially preset positions and connection sequences.

According to one embodiment of the present invention, in the first predicted control point extraction step, when the object of the image inside the bounding box is obscured by another object, the connection sequence of the control points may be changed by using the learned sequence adjustment artificial neural network model such that the part obscured by another object is excluded from the object defined by the connection sequence of the control points.

According to one embodiment of the present invention, in the first predicted control point extraction step, relational information between the control points may be derived by the sequence adjustment artificial neural network module based on detailed information of the feature map information corresponding to the positions of the control points, and the connection sequences of the control points may be changed based on the relationship information.

According to one embodiment of the present invention, the predicted control point display step may include: first display elements indicating control points, respectively; and second display elements for displaying sequences between the control points.

According to one embodiment of the present invention, in the change input reception step, when a position of a specific control point is moved by the user input, the display elements for displaying the specific control point and sequences between other control points having a previous and next sequences may be also changed and displayed according to the movement of the position of the specific control point.

In order to solve the above problem, one embodiment of the present invention provides a computing system including at least one processor and at least one memory to input annotation of object boundary information for an image, and the computing system performs: a bounding information input step of receiving information on a bounding box inside the image from a user; a first prediction control point extraction step of extracting a plurality of control points related to a predicted object boundary from an image inside the bounding box by using a learned artificial neural network model; a predicted control point display step of overlaying and displaying the predicted control points on the image inside the bounding box in a form of having reciprocal connection sequences; and a change input reception step of receiving a position change input for at least one of the control points from the user.

In order to solve the above problem, one embodiment of the present invention provides a computer program stored on a computer-readable medium and including a plurality of instructions executed by at least one processor, and the computer program includes: a bounding information input step of receiving information on a bounding box inside the image from a user; a first prediction control point extraction step of extracting a plurality of control points related to a predicted object boundary from an image inside the bounding box by using a learned artificial neural network model; a predicted control point display step of overlaying and displaying the predicted control points on the image inside the bounding box in a form of having reciprocal connection sequences; and a change input reception step of receiving a position change input for at least one of the control points from the user.

According to the embodiments of the present invention, the interactive object annotation crowd sourcing service for object segmentation can be provided.

According to the embodiments of the present invention, the initial polygon topology can be converted to the topology for the object, and the outline of the target object can be determined with high accuracy even when the target object is obscured by another object.

According to the embodiments of the present invention, the outline of the object can be detected by moving each vertex of a polygon in a novel way based on a graph convolution neural network (GCN).

According to the embodiments of the present invention, the positions of the vertices of the polygon and the dependencies of adjacent vertices connected thereto are simultaneously considered, so that the outline of the object can be detected.

According to the embodiments of the present invention, the direction toward the boundary of the target object of pixels may be derived using a motion vector branch, so that maps for finding an exact route to an unknown goal can be used.

According to the embodiments of the present invention, segmentation work on the polygon vertices is performed not only by considering the feature information of the vertices, but also by using the feature information of other vertices, in which the topology of graph data composed of the polygon vertices is regenerated, so that the object outline or area in consideration of the obscured portion of the object can be detected.

According to the embodiments of the present invention, the initial polygon topology based on a new architecture is converted to the topology of the target object, so that the outline can be detected.

According to the embodiments of the present invention, the object element obscured by another object can be determined by a self-attention-based segmentation-network and the target object can be detected except for the portion obscured by another object.

According to the embodiments of the present invention, the polygonal shape of the object can be detected through segmented elements.

According to the embodiments of the present invention, although the polygonal shape of the object is obscured by another object, the obscured problem can be solved by controlling the movement/deletion or the like of some polygon vertices.

According to the embodiments of the present invention, a new deep artificial neural network architecture is used, so that the object boundary information can be extracted with high accuracy based on polygon-based approach and self-attention mechanism.

According to the embodiments of the present invention, control points subject to a sequence are connected, so that the object can be displayed and detected.

According to the embodiments of the present invention, even when the entire image is inputted, an image cropped to a target area related to the object can be given as an input value for the accurate detection, and the polygon vertices may be moved by the learned artificial neural network, so that the outline or shape of the object can be derived in a recursive way.

According to the embodiments of the present invention, the adjacency matrix is used to determine whether the polygon vertices of the detected object are connected or disconnected, so that only the outline of the object can be derived even when the object is obscured by another object.

BRIEF DESCRIPTION OF THE DRAWINGS

FIG. 2 schematically shows a process of extracting a main feature map according to one embodiment of the present invention.

FIGS. 22A, 22B and 22C exemplarily show a process of improving the accuracy of the object boundary information according to one embodiment of the present invention.

FIGS. 25A and 25B schematically show a part of a calculation process of the attention information derivation step according to one embodiment of the present invention.

FIGS. 26A and 26B schematically show a part of a calculation process of the attention information derivation step according to one embodiment of the present invention.

FIG. 27 schematically shows an operation product of the attention information derivation step according to one embodiment of the present invention.

DETAILED DESCRIPTION OF THE INVENTION

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The terms "embodiment", "example", "aspect" or the like used herein may not be construed in that an aspect or design set forth herein is preferable or advantageous than other aspects or designs. The terms 'unit', 'component', 'module', 'system', 'interface' or the like used in the following generally refer to a computer-related entity, may refer to, for example, hardware, software, or a combination of hardware and software.

In addition, it will be understood that the terms "include" and/or "comprise" specify the presence of the corresponding feature and/or element, but do not preclude the possibility of the presence or addition of one or more other features, elements or combinations thereof.

In addition, the terms including an ordinal number such as first and second may be used to describe various elements, however, the elements are not limited by the terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of related listed items or a combination thereof.

In addition, in embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

Figure 1A:
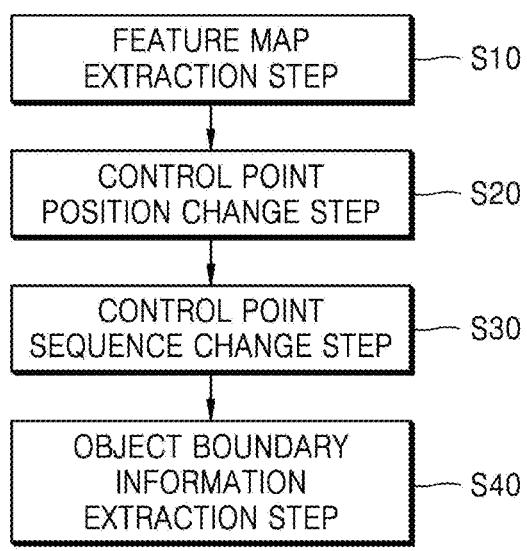
FIGS. 1A and 1B schematically show overall steps of a method of extracting object boundary information according to one embodiment of the present invention.
Figure 1B:
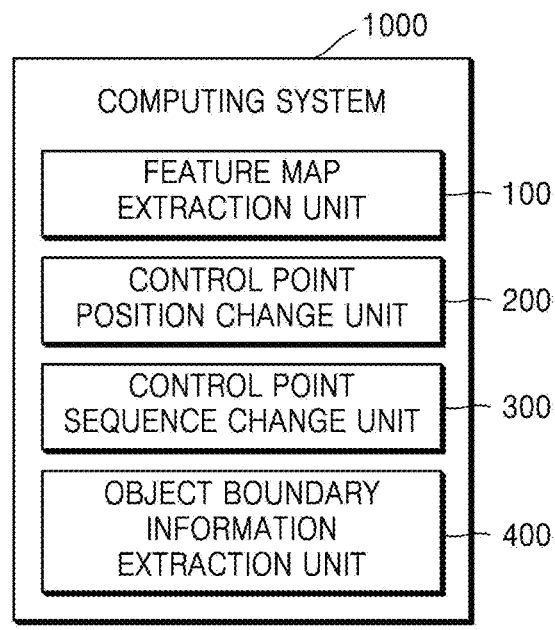

FIGS. 1A and 1B schematically show overall steps of a method of extracting object boundary information according to one embodiment of the present invention.

The method of extracting object boundary information of the present invention is performed on a computing system having one or more processors and one or more memories.

According to one embodiment of the present invention, the method of extracting object boundary information may be performed in a server system to provide a result thereof to a user terminal. Alternatively, according to one embodiment of the present invention, the method may be performed directly on the user terminal, or in another embodiment, some of the steps described later may be performed in the server system and the remaining steps may be performed in the user terminal.

The method of extracting object boundary information according to the embodiments of the present invention includes: a feature map extraction step (S10) of extracting feature map information for each pixel or pixel group of a target image by using a learned feature map generation artificial neural network module; a control point position change step (S20) of changing the positions of the control points by using a learned control point adjustment artificial neural network module such that a plurality of control points are close to a boundary of an object using the feature map information with respect to a plurality of control points having initially preset positions and connection sequences; and a control point sequence change step (S30) of changing a connection sequence of the control points based on detailed information of the feature map information corresponding to the changed positions of the control points by using a learned sequence adjustment artificial neural network module; and an object boundary information extraction step (S40) of extracting object boundary information based on information about the control points and the connection sequence.

Steps S10, S20, S30, and S40 shown in FIG. 1(A) may be performed by a feature map extraction unit 100, a control point position change unit 200, a control point sequence change unit 300, and an object boundary information extraction unit 400 of FIG. 1(B), respectively. The computing system may include a plurality of physical sub-computing systems. For example, a user terminal and a server system may be included in the computing system. The feature map extraction unit 100, the control point position change unit 200, the control point sequence change unit 300, and the object boundary information extraction unit 400 may be distributed and implemented by computing devices having physically different processors and memories, respectively.

In addition, each of the feature map extraction unit 100, the control point position change unit 200, the control point sequence change unit 300, and the object boundary information extraction unit 400 may be implemented in a distributed manner by computing devices having physically different processors and memories, respectively, for each partial function.

In step S10, a feature map extraction step, of extracting feature map information for each pixel or pixel group of a target image by using a learned feature map generation artificial neural network module, is performed.

The target image may correspond to a cropped image from the entire image. When the method of extracting object boundary information according to the embodiments of the present invention is used in a service for inputting object annotations based on crowd sourcing, the entire image may be provided to a user, in the embodiments, to enable the user to input a target image area, and then steps S10 to S40 may be performed for the corresponding target image area. Alternatively, in another embodiment of the present invention, an area for the target image may be automatically extracted from the entire image by a learned artificial neural network module or a preset rule-based setting module.

In step S20, positions of the control points are changed by using a learned control point adjustment artificial neural network module such that a plurality of control points are close to a boundary of an object using the feature map information with respect to a plurality of control points having initially preset positions and connection sequences.

Accordingly, in step S20, the control points are arranged to be adjacent to the boundary, based on the feature map information generated in S10. In the present invention, basically, control points are provided with preset initial positions and a connection sequence, and the control points are recursively moved to boundary points based on the artificial neural network module.

Each control point has at least connection sequence. For example, control point N has a connection sequence with control point N−1 and control point N+1. In this case, two lines (e.g., straight lines) embodied by the control point N−1, the control point N, and the control point N+1 may correspond to the boundary of the object.

In step S30, the connection sequence of the control points is changed based on detailed information of the feature map information corresponding to the changed positions of the control points by using a learned sequence adjustment artificial neural network module.

In the embodiments of the present invention, after boundary information of the object is primarily derived by the control point adjustment artificial neural network module learned to move control points to the boundary of the object as shown in S20, only the actual object part in the corresponding area is derived while taking the scale variability, overlap/occlusion, or motion blur into consideration.

For example, when the object inside the target image is obscured by another noisy object, an area excluding the noisy object part is required to be derived as boundary information of the object. According to the present invention, the object boundary information is defined by a plurality of control points and connection sequences, the actual object part as above is derived by changing the connection sequence.

In the above manner, the method of removing some connection sequences while maintaining the control points may respond to the scale variability, overlap/occlusion, or motion blur, and particularly, have robust performance against the overlap/occlusion.

For example, when a connection sequence for control points is set as control points 1-2-3-4-5-6-7-8-9-10-1, and a space between control point 5 and control point 6 is obscured by a noisy object, the connection sequence between control point 5 and control point 6 is removed. In this case, an object area may be defined as a first area including control points 1-2-3-4-5-1 and a second area including control points 6-7-8-9-10-6.

In one embodiment of the present invention, after repeating until a result value converges based on the criteria preset in S20, S30 may be performed. In this case, the positions of the control points changed by S20 may be inputted as initial values in the next step S20, so that S20 may be performed.

Alternatively in another embodiment of the present invention, S20 and S30 may be performed multiple times as one set.

In step S40, object boundary information is extracted based on the information about the control points and the connection sequences. As described above, the control points and the connection sequences may define at least one object area. According to one embodiment of the present invention, one or more groups of control points and connection sequences may implement each closed loop, and the object boundary information may be derived as a plurality of areas for one object.

Step S10 may correspond to an encoder part implemented by a network extracting features of Split-GCN of the present invention. The above encoder part corresponds to a part for extracting boundary information or outline information of the object.

Meanwhile, S20, S30 and S40 may correspond to a decoder part that detects an area of the object by using the features extracted by the encoder part and a new graph element network.

Hereinafter, the encoder part for extracting features will be described, and then decoder part will be described in detail.

FIG. 2 schematically shows a process of extracting a main feature map according to one embodiment of the present invention.

The feature map information used in steps S20 and S30 includes: main feature map information extracted from each pixel or pixel group of the target image and formed by integrating a plurality of detailed feature maps having at least two different resolutions.

According to the present invention, information about the object boundary is more efficiently extracted and used in steps S20 and S30 in common through the feature map generation artificial neural network module, so that the accuracy of object extraction may be increased while reducing the amount of computation. The degree in accuracy may be significantly improved compared to the method of extracting object boundary information by a learned single artificial neural network module. In addition, since a model for extracting data from which the object boundary information is extracted, a model for primarily deriving the object boundary information and a model for improving accuracy of the object boundary information are trained using each learning material, an inference system having high accuracy can be implemented even with a small amount of training data.

S20 and S30 corresponding to the decoding part derive the object boundary by transforming a polygon including boundary points and the connection sequences, based on feature map information including a main feature map as shown in FIG. 2. In other words, the artificial neural network model for data to be used as basic information is separated from the artificial neural network model for deriving the object boundary information, so that higher accuracy and computational efficiency may be achieved.

According to one embodiment of the present invention, main feature map information corresponding to high-level semantic information is extracted from the target image by using a CNN-based artificial neural network model. In addition, in the embodiments of the present invention as described later, motion vector information is extracted and added to the main feature map so as to be included in final feature map information, and accordingly guide information is provided for moving a polygon composed of a preset initial boundary points to the boundary of the corresponding object, thereby remarkably improving efficiency and accuracy of computing.

In the embodiments of the present invention, a bounding box may be primarily set to extract a main feature. The bounding box may be set by a user input, or may be set by other automated methods. Alternatively, steps S10 to S40 may be performed for a given entire image without the bounding box.

According to one embodiment of the present invention, a bounding box such as 224×224 (pixel dimension) may be set. The target image of FIG. 2 is an image corresponding to the above bounding box.

The target image in the cropped bounding box is encoded as high-quality semantic information by using CNN. According to one embodiment of the present invention, ResNet-50 may act as a backbone network of the feature extraction network.

However, in the exemplary embodiment of the present invention, a CNN approach except for average pooling and fully connected layers (FC) is used, so that boundary information of the object is extracted from the artificial neural network model related to steps S20 and S30 and separately learned, without extracting a polygon shape of the object in the encoder step of S10.

As shown in FIG. 2, in the embodiment of the present invention, a plurality of detailed feature maps are extracted and information thereof is integrated into the main feature map. This is to comprehensively consider information that may be removed in a pooling process of the feature map. This is because step S10 of the present invention is configured to derive intermediate information for deriving the object boundary information, rather than finally deriving the object boundary information.

The detailed feature maps shown in FIG. 2 may have different dimensions. For example, detailed feature map #1 may have a dimension of 112×112×64, and detailed feature map #2 may have a dimension of 56×56×256. Lower level feature maps may have decreased or maintained dimensional resolutions and channels may be maintained or increased.

The resolutions of the extracted feature maps are adjusted for the detailed feature maps extracted in the above manner, by using a residual encoder architecture, and accordingly, the two-dimensional resolutions of the feature maps are unified (e.g., 112×112), so that the main feature map may be generated.

In this case, only some information may be selected from the detailed feature maps so as to be included in the information of the main feature map, and the selection process may also be performed by the trained artificial neural network module.

In the above manner, in the embodiments of the present invention, high-quality semantic information may be obtained while simultaneously obtaining low-level details.

When the detailed feature maps with different two-dimensional resolutions are merged in the process of merging the above detailed feature map to the main feature map, for example, the resolutions of feature maps obtained in each convolution step prior to concatenation (CONCAT) may be sorted with high resolutions by using bilinear interpolation.

The sorted feature map information may be expressed as $$F_c \in \mathbb{R}^{C' \times H' \times W'}$$

one main feature map through CONCAT. The above main feature map is the result formed by filtering the sorted feature map information with a stride of 2, for example, with a 3×3 convolution filter, and then data-processing the filtered feature map information through the batch normalization and the ReLU activation function. Herein, C' denotes a channel, and H' and W' denote a height and a width of a first feature map.

In the embodiments of the present invention, the initial control points of the polygon are moved to the boundary of the object in step S20 by using the feature map information including the above main feature map, so that the boundary of the object may be detected. According to a preferred embodiment of the present invention, the movements of vertices may be more accurately performed using the motion vector information.

Figure 3A:
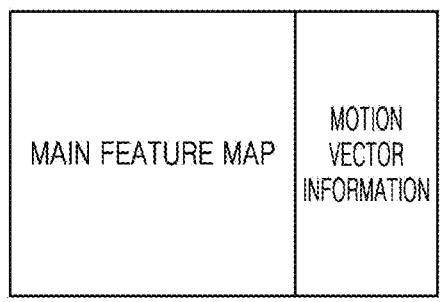
FIGS. 3A, 3B and 3C schematically show feature map information according to the embodiments of the present invention.
Figure 3B:
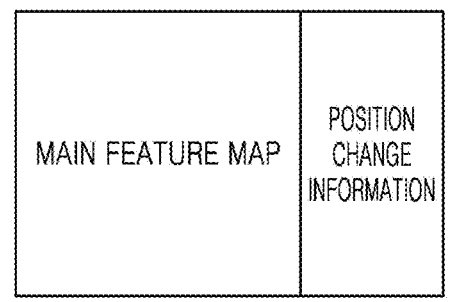
Figure 3C:
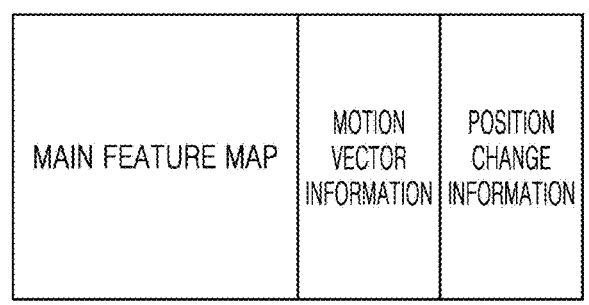

FIGS. 3A, 3B and 3C schematically show feature map information according to the embodiments of the present invention.

In the embodiment shown in FIG. 3(A), the feature map information may further include motion vector information derived by the learned motion vector artificial neural network module from each pixel or pixel group to the outline of the target image.

The motion vector artificial neural network module corresponds to a module learned separately from the aforementioned feature map generation artificial neural network module, and derives motion vector information from each pixel or pixel group of the target image to the outline of the object included in the target image.

the feature map information shown in FIG. 3(B) may further include position change information including information about changes in at least one of one or more control points and one or more chained sequences by the user, in addition to the above-mentioned main feature map.

The position change information corresponds to the change information manually inputted by the user for positions of control points determined in the initial or previous step. The position change information may be implemented by moving a position of an individual control point, or may also be implemented by enlarging or reducing the entire control points. In other words, changes of all or some control points according to an inputted scenario also may be the above position change information.

Alternatively, in another embodiment of the present invention, the position change information may also be implemented in the form of removing, modifying, or adding a specific connection sequence.

Figure 4:
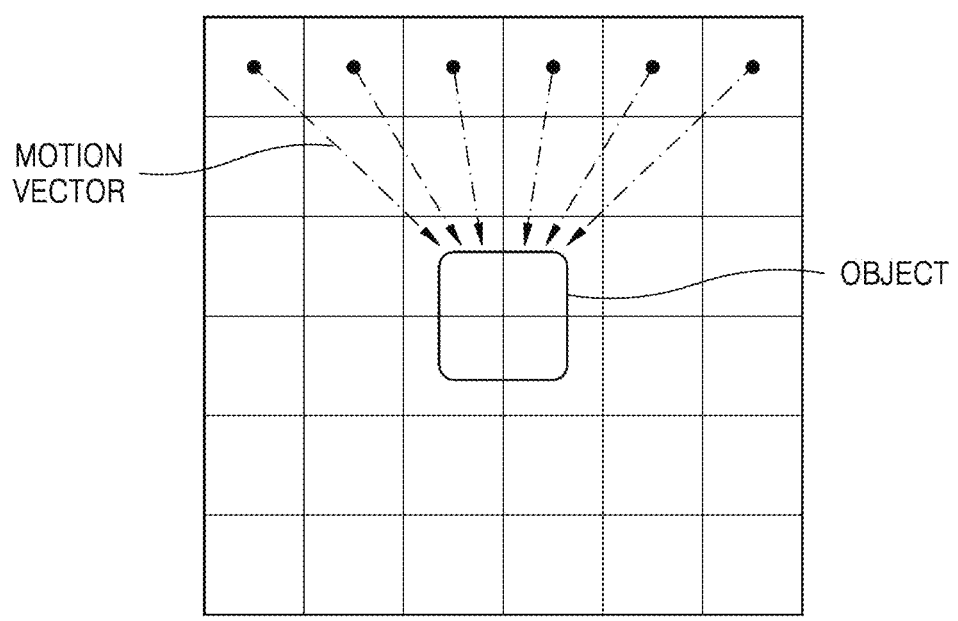
FIG. 4 exemplarily shows motion vector information according to one embodiment of the present invention.

FIG. 4 exemplarily shows motion vector information according to one embodiment of the present invention.

As described above, in one embodiment of the present invention, a motion vector from each point to a boundary or outline of a predicted object may be derived by a separately learned motion vector artificial neural network module. Accordingly, in the present invention, the separate motion vector artificial neural network module is separately used, so that the accuracy in step S20 may be improved. As shown in FIG. 4, the motion vector information includes information about the shortest path from each pixel or pixel group of the target image to the outline of the object. In other words, the motion vector information corresponds to information containing directions and sizes.

According to one embodiment of the present invention, the motion vector artificial neural network module may predict a ground truth (GT) motion map corresponding to the motion vector information by using at least one of one or more convolutional layers and one or more of fully connected (FC) layers.

The above GT motion map may be expressed as the expression $\vec{U}_{gt} \in \mathbb{R}^{2 \times H' \times W'}$, which may signify the direction from each pixel or pixel group to the boundary. Herein, 2 denotes x and Y-axis directions, and H' and W' are a height and a width corresponding to the size of the FC. In other words, the motion vector information may have a dimension (multiplied by n) corresponding to a two-dimensional resolution of the main feature map. The dimensions and values of the motion vector information may be determined in various forms.

In other words, the motion vector information has a magnitude and a direction at each point (corresponding to a pixel or pixel group). This may be implemented with the X-axis size and Y-axis size of the motion vector, respectively, or may be implemented through different coordinate systems.

The motion vector information may be derived from the aforementioned main feature map, but preferably, may be derived from the target image itself.

Meanwhile, the GT motion map corresponding to the motion vector information may be expressed as the following expression.

$$\vec{U}_{gt}(x, y) = -\frac{\nabla \phi_{DT}(x, y)}{|\nabla \phi_{DT}(x, y)|}$$

Herein, the following expressions is set.

$(x_{gt}, y_{gt}) \in G$ $\phi_{DT}(x, y) = \min_{(x_{gt}, y_{gt}) \in G} \|(x, y) - (x_{gt}, y_{gt})\|_2$ Herein, G is a set of GT boundary points.

In the exemplary embodiment of the present invention, since a boundary of an object has, for example, one pixel in size, the target image is image-processed to further thicken the boundary using a Gaussian filter or the like (e.g., 9×9), and then inputted to the motion vector artificial neural network module to derive the motion vector information, in order for the motion vector artificial neural network module to predict more accurately.

The motion vector generated in the above manner is concatenated (CONCAT) to the main feature map, so that the above-described feature map information may be derived. The final feature map information includes motion vector information from each pixel or pixel group to the shortest boundary of the object together with high-level semantic information.

Figure 5:
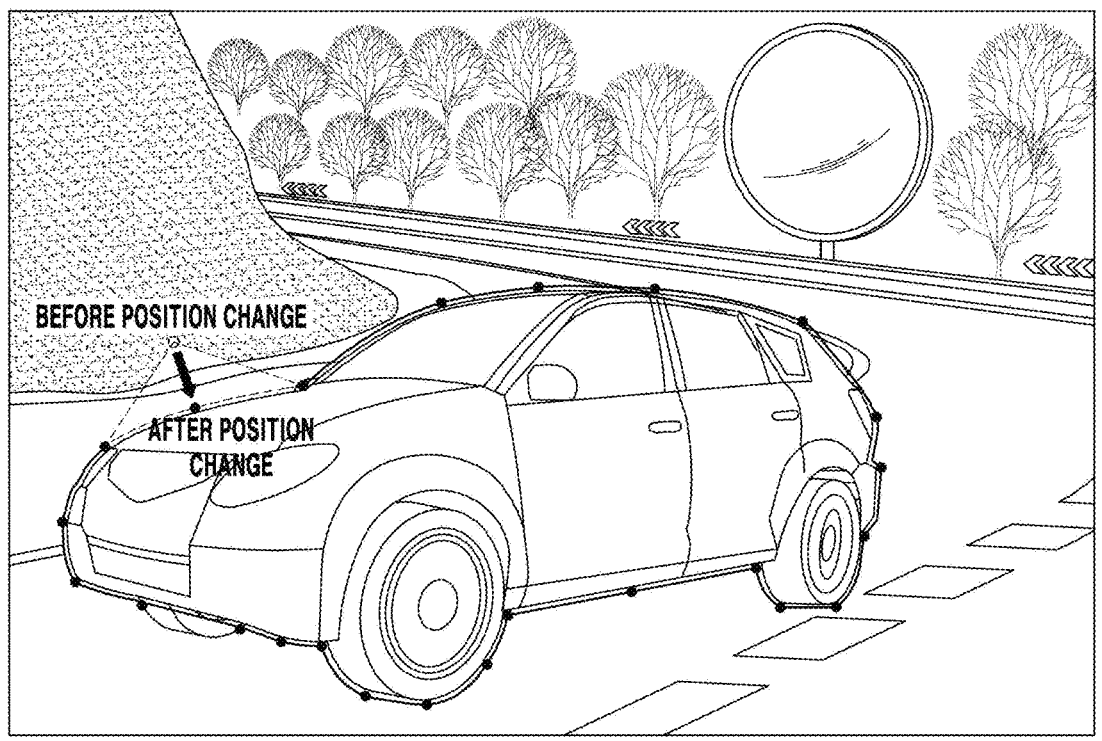
FIG. 5 exemplarily shows location change information according to one embodiment of the present invention.

FIG. 5 exemplarily shows location change information according to one embodiment of the present invention.

In the embodiments of the present invention, after at least one of steps S20, S30, and S40 is performed, editing information such as addition, change, or deletion of a position of the control point or connection sequence may be inputted by the user input.

For example, after S20 is performed, an interface for inputting the editing information may be provided to the user. Thereafter, when the user enters editing information, the corresponding editing information is added to the main feature map as position change information and considered in steps S20 and S30, so that the object boundary information may be derived more accurately.

FIG. 5 shows an example of a position change inputted by the user for some control points. For example, when steps S10, S20, S30, and S40 are performed to display the boundary information of the object including a dotted line to the user, the user may move some control points as shown in FIG. 5.

In this case, in step S10, the position change information is reflected to change the feature map information, and steps S20 and S30 are performed based on the changed feature map information. Through the above process, positions of the control point and connection sequences may be derived more accurately in S20 and S30.

Figure 6:
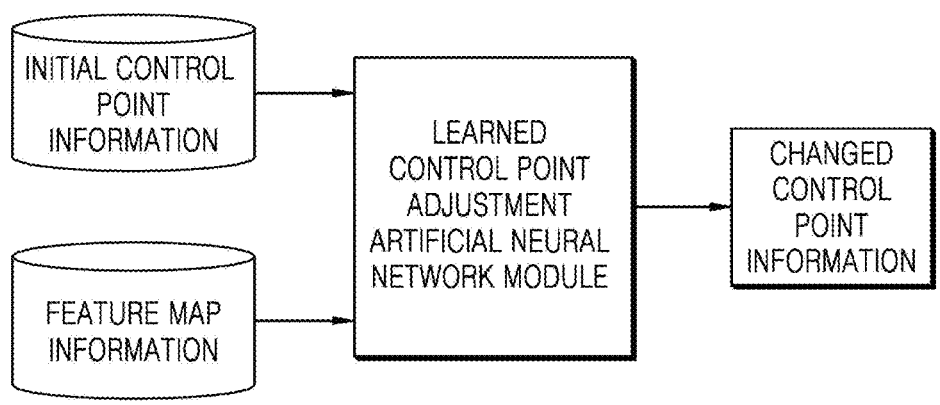
FIG. 6 schematically shows an operation of a control point adjustment artificial neural network module according to one embodiment of the present invention.

FIG. 6 schematically shows an operation of a control point adjustment artificial neural network module according to one embodiment of the present invention.

In the aforementioned control point position change step (S20), positions of the control points are changed by using a learned control point adjustment artificial neural network module such that a plurality of control points are close to a boundary of an object using the feature map information with respect to a plurality of control points having initially preset positions and connection sequences.

In other words, the artificial neural network learned through the feature map information derived in step S10 allows the control points to be close to the boundary of the object by changing positions of the initial control points at least one time. S10 may be performed continuously until a specific criterion is conformed recursively.

In the exemplary embodiment of the present invention, the control point control artificial neural network module may include a graph composition neural network module. The control points and the connection sequences between the control points according to the embodiments of the present invention may be regarded as a kind of graph information, and step S30 may be processed by the graph composition neural network module for processing the graph information, so that the efficiency may be increased.

In the embodiments of the present invention, step S30 may be performed using a graph element network. The graph element network may define a target boundary by using N control points (vertices forming a polygon), and move positions of the control points, so that the boundary information of the object may be primarily derived.

According to one embodiment of the present invention, basically, control points of the polygon are used as random variables, and a correct position of each control point, that is, a position corresponding to the boundary of the object is found by using a graph composition neural network (GCN) module. Various types of disclosed modules may be used for the graph composition neural network module. Preferably, in the process of finding the positions of the control points, a graph composition neural network module, which is configured to use nearby points that may provide cue information for each target object, is used.

Preferably, each of the initial control points before the control point sequence change step has a connection relationship with two or more other control points. For example, when there is a relationship of control point 1—control point 2—control point 3—control point 4—control point 5—control point 1, control point 2 has a connection sequence with control point 1 and control point 3.

Figure 7:
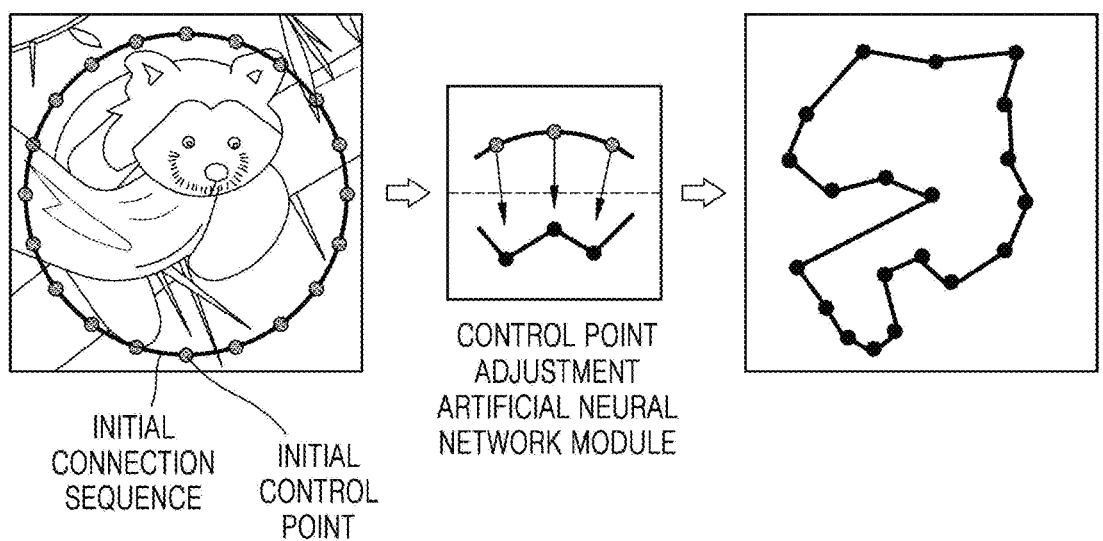
FIG. 7 schematically shows an operation process of a control point position change step according to one embodiment of the present invention.

FIG. 7 schematically shows an operation process of a control point position change step according to one embodiment of the present invention.

As described above, according to one embodiment of the present invention, the feature map information may be generated by concatenating motion vector information normalized to the main feature map. Alternatively, according to one embodiment of the present invention, the feature map information may be generated while including change information on one or more control points of the polygon that expresses the boundary by the user in the main feature map. Since change information by the user is reflected in the feature map information, movement information of the vertices to the boundary may be more accurately derived using the change information.

Alternatively finally, the feature map information may include at least one of the motion vector information and the change information in the main feature map.

In the embodiments of the present invention, preferably, the feature map information may be generated, in order to further increase the resolution, by extending the resolution from the feature map in which additional information is concatenated to the main feature map. In this case, a bilinear interpolation method or the like may be applied. The final feature map information embedded in the above manner will be referred to as F.

The control point adjustment artificial neural network model according to the embodiments of the present invention moves N control points so as to be positioned at the boundary of the object. According to one embodiment of the present invention, the above operation may be performed by feature exchange of N feature vectors.

The feature vectors correspond to feature map information according to coordinates of N control points extracted from control point embedding. In the above manner, since each coordinate of each feature map information includes not only information about its own coordinates (pixel or pixel group) but also information about adjacent pixels or pixel groups, the control point adjustment artificial neural network may be operated based on only the feature map information corresponding to the control points in the feature map information.

Alternatively in another embodiment of the present invention, positions of the control points may be changed by using a form that includes all or part (including a feature map from a pixel group or pixel having no relation with the control points) of the feature map information.

As shown in FIG. 7, N control points are given with initial positions. Each of the control points has connection sequence information. For example, in the embodiment shown in FIG. 7, a fixed circular topology may be given as a shape that covers about 75% of the target image corresponding to the bounding box.

The ground truth point set may be uniformly extracted from the boundary of the object. Herein, the predicted points may be expressed as P= $\{p_i=(x_i, y_i)\}_{i=0, 1, \ldots, N-1}$, and ground truth points may be expressed as $Q=\{q_i=(x'_i, y'_i)\}_{i=0, 1, \ldots, N-1}$. Herein, N is the number of control points.

In the embodiment of the present invention, preferably, a more accurately predicted set of points may be extracted using a publicly known Graph-ResNet.

Meanwhile, feature vectors may be expressed as follows.

$$f_{(x_i, y_i)}^l = \text{concat}\{F(x_i, y_i), x_i, y_i, \Delta_H x_i, \Delta_H y_i\}$$

Herein, i denotes a current index, and l denotes a layer.

Preferably, it may be normalized through the relation of $x_i, y_i \in [0, 1]$.

Meanwhile, ΔH denotes a value changed by the user interface, that is, denotes the above-described position change information. When there is no user's interface, that is, the user's manipulation on some points, $\Delta H^{x_i}$ and $\Delta H^{y_i}$ may be set to 0.

In the feature vector defined as above, Graph-ResNet derives movement information of the control points based on the following steps.

$$r_{p_i}^l = \sigma\left(w_0^l f_{p_i}^l + \sum_{z \in N(p_i)} w_1^l f_z^l\right)$$

$$r_{p_i}^{l+1} = \tilde{w}_0^l r_{p_i}^l + \sum_{z \in N(p_i)} \tilde{w}_1^l r_z^l.$$

The following feature vectors may be derived from $r_{p_i}^{l+1}$ and $f_{p_i}^l$.

$$f_{p_i}^{l+1} = \sigma(r_{p_i}^{l+1} + f_{p_i}^l)$$

The FC layer is obtained from the last layer in the last GCN, and accordingly, movement information in the x-direction and y-direction may be derived from the current position of the control point.

Then, feature vectors at the changed control points are extracted in the next GCN layer, and the above process is repeated, so that the control points may be moved to the outline.

Figure 8:
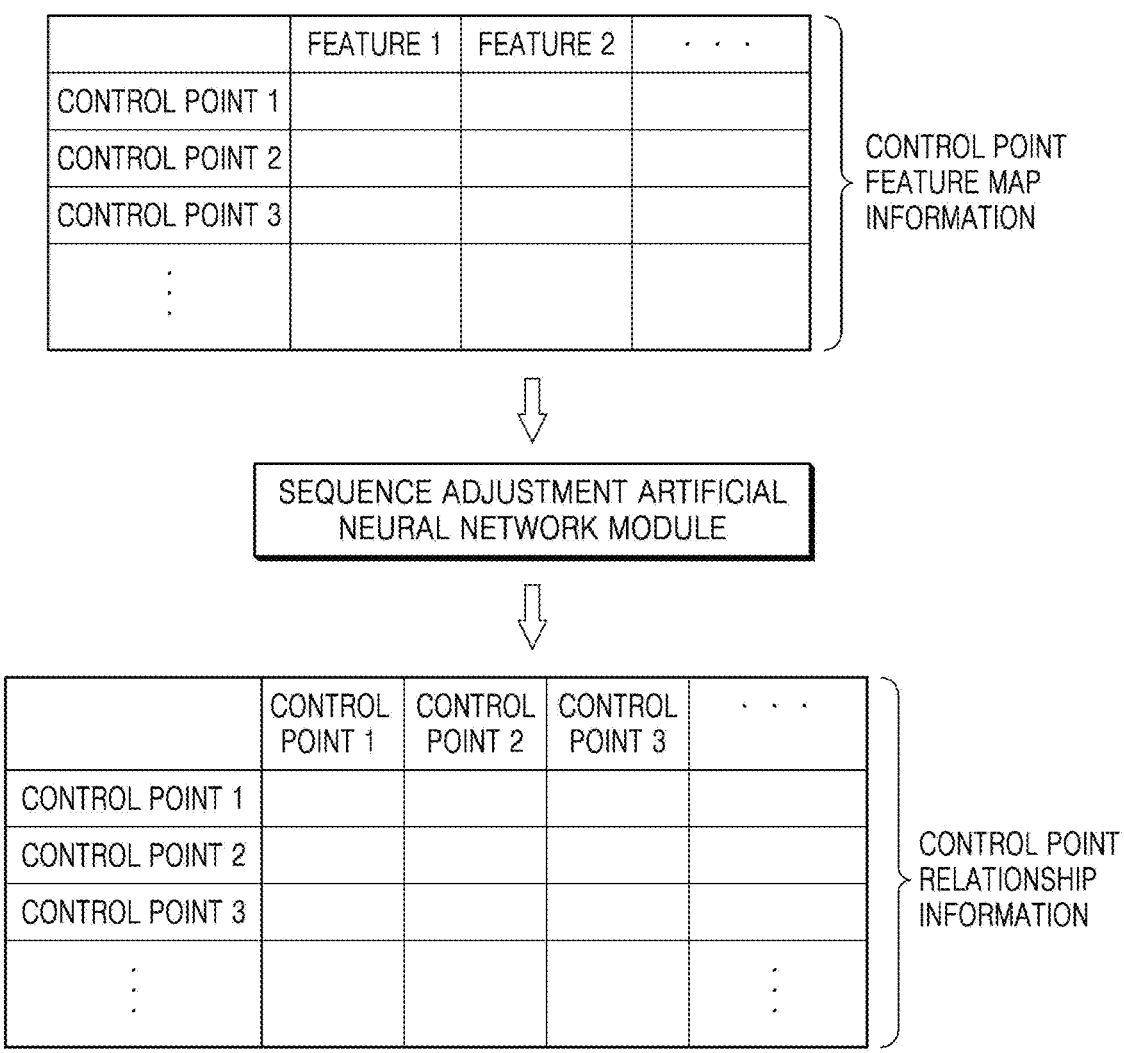
FIG. 8 schematically shows a process of deriving control point relationship information by a sequence adjustment artificial neural network module according to one embodiment of the present invention.

FIG. 8 schematically shows a process of deriving control point relationship information by a sequence adjustment artificial neural network module according to one embodiment of the present invention.

In the control point sequence change step, relational information between the control points is derived by the sequence adjustment artificial neural network module based on detailed information of the feature map information corresponding to the positions of the control points, and the connection sequences of the control points are changed based on the relationship information.

In the embodiments of the present invention, the relationship information between vertices, that is, the dependency, is identified by using a segmentation network, the graph topology implemented by the information on control points and connection sequences is accordingly regenerated, and the connection sequences between the control points are changed based on the dependencies. According to one embodiment of the present invention, a part of the connection sequences may be removed, and accordingly information about the object area is changed.

According to one embodiment of the present invention, a self-attention transformer network may be used in order to implement the above approach. In this case, the complex dependencies can be handled.

The upper table as shown in FIG. 8 corresponds to feature map information at each control point (a pixel or corresponding pixel group of the control point). The sequence control artificial neural network module derives relationship information between the control points from the feature map information related to the above control points.

Then, in step S30, the connection sequences are changed based on the relationship information.

For example, it is normal that each control point has high relationship information or dependency information with immediately previous and next control points. However, when the relationship information or dependency information with the immediately previous and next control points at a specific control point is significantly low compared to preset criteria or numerical values indicated at other control points, the dependency or similarity between the corresponding control points is determined as being low, so that the relationships therebetween may be excluded.

In step S30 as above, a new graph topology is generated by reflecting the relationship information.

In the exemplary embodiment of the present invention, disconnected points are predicted by considering the dependency between the vertices based on a self-attention transformer network. Most of the disconnected points correspond to the object obscured by another noisy object and the like. When the object is obscured by the noisy object in the above manner, only the part of the object can be accurately extracted.

In the exemplary embodiment of the present invention, in order to regenerate the graph topology, the sequence adjustment artificial neural network module may use feature map information of the control points given in the previous step as an input value, thereby constructing an adjacency matrix.

The adjacency matrix uses control point embedding information of $f \in \mathbb{R}^{N \times (C'+2+2)}$. C' may correspond to the number of channel for each pixel or pixel group of the main feature map, and 2+2 may correspond to motion vector information and the position change information by the user.

Accordingly, the sequence adjustment artificial neural network module may derive the relationship information of control points from the feature map information for each control point. In step S30, the connection sequence may be changed, for example, a specific connection sequence may be removed based on the relationship information.

The relationship information of control points may have an adjacency matrix shape as shown in FIG. 8.

Preferably, according to one embodiment of the present invention, a transformer-based self-attention mechanism is used to derive the dependency between control points, by using the following equation.

$$\text{Attn}(Q(f), K(f), V(f)) = \text{softmax}\left(\frac{Q(f)K^T(f)}{\sqrt{d_k}}\right)V(f)$$

Preferably, in the embodiment of the present invention, after the above self-attention mechanism, a vanilla transformer encoder is performed, and the above process is performed multiple times, for example, six times. An FC layer applied by a sigmoid function may be obtained from the last transformer layer, and an adjacency matrix of N×N may be obtained therefrom.

The sequence adjustment artificial neural network module may be configured in other ways, and may be implemented by a learned artificial neural network capable of deriving relational information, such as similarity, correlation, and dependency between the control points, from the feature map for each control point.

Figure 9:
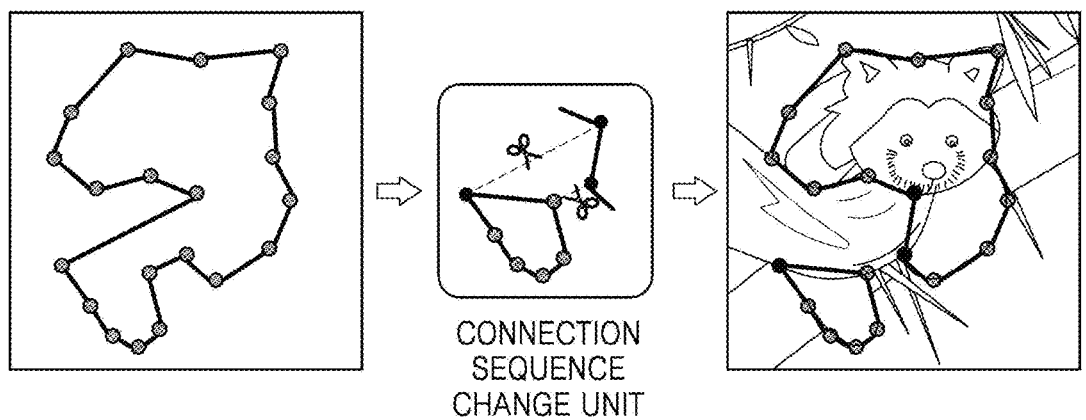
FIG. 9 schematically shows an operation of a connection sequence change unit according to one embodiment of the present invention.

FIG. 9 schematically shows an operation of a connection sequence change unit according to one embodiment of the present invention.

As shown in FIG. 9, in the control point sequence change step (S30), when the object in the target image is obscured by another object, the connection sequence of the control points may be changed such that the part obscured by another object is excluded from the object defined by the connection sequence of the control points.

Specifically, the shape on the left of FIG. 9 corresponds to the control points and the connection sequences determined by S20 or the previous S20 and S30. Then, some connection sequences may be removed by the connection sequence change step in consideration of the dependency between control points, and accordingly, boundary information of the object may be extracted while excluding the noisy object obscuring the target object as in the shape on the right.

In other words, in the control point sequence change step (S30), the two connection sequences between the control points are removed based on detailed information of the feature map information corresponding to the changed positions of the control points by using a learned sequence adjustment artificial neural network module.

Figure 10:
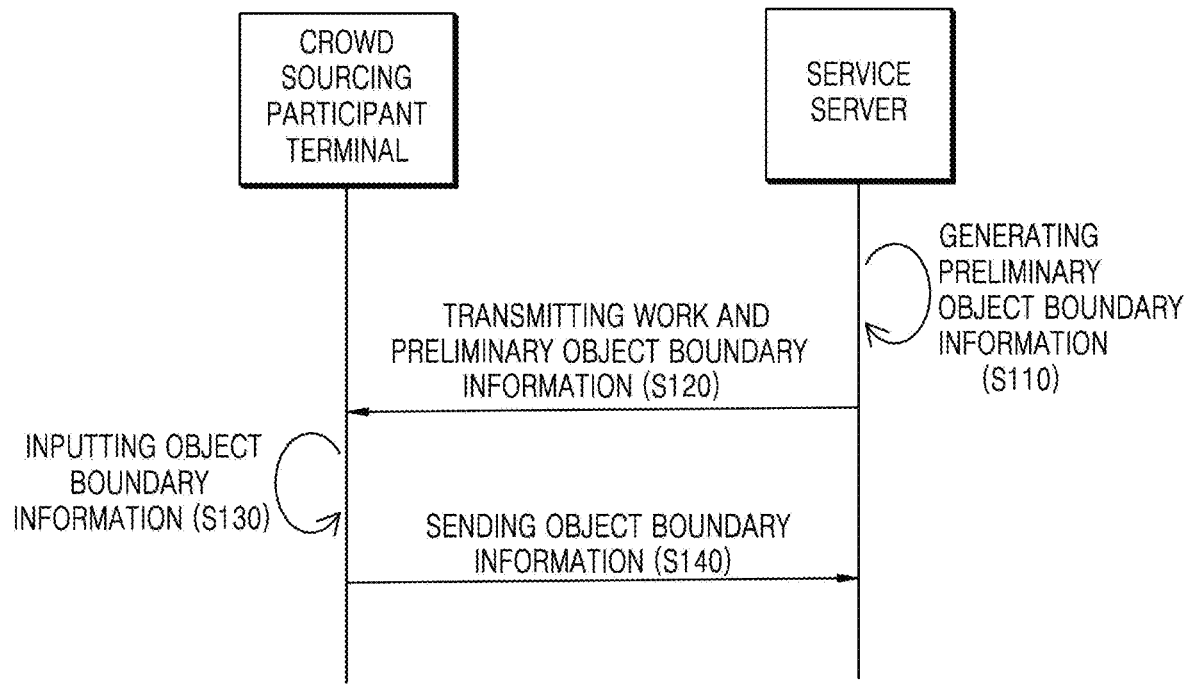
FIG. 10 schematically shows service steps to which the method of extracting object boundary information is applied according to the embodiments of the present invention during object boundary information annotation work in crowd sourcing according to one embodiment of the present invention.

FIG. 10 schematically shows service steps to which the method of extracting object boundary information according to the embodiments of the present invention is applied during object boundary information annotation work in crowd sourcing according to one embodiment of the present invention.

In step S110, the object boundary information described with reference to FIGS. 1 to 9 is generated.

In step S120, work (such as cropped target image) and preliminary object boundary information are transmitted. In this case, the object boundary information extracted in step S110 may be displayed and provided on the target image.

Then, object boundary information is inputted in step S130. For example, the user may move positions of some control points or modify (e.g., add, create and edit) some connection sequences. The annotation operation on the object boundary information may be completed by transmitting the modified object boundary information to a service server, or S110 may be performed again by reflecting the changed position information of the control points inputted by the user according to the user's request.

Figure 11A:
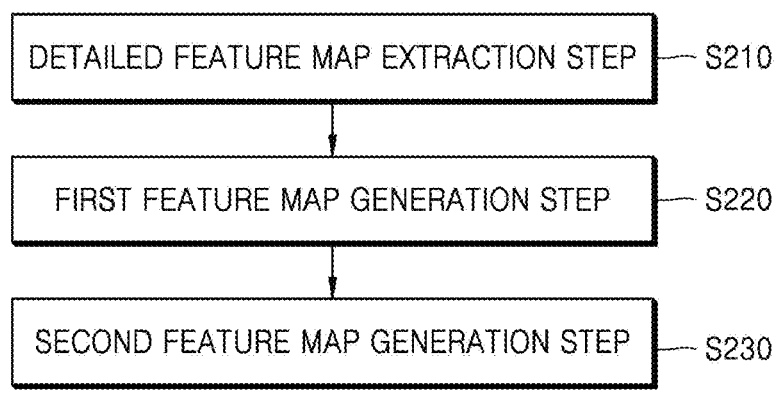
FIGS. 11A and 11B schematically show all steps of a method of generating feature map information according to one embodiment of the present invention.
Figure 11B:
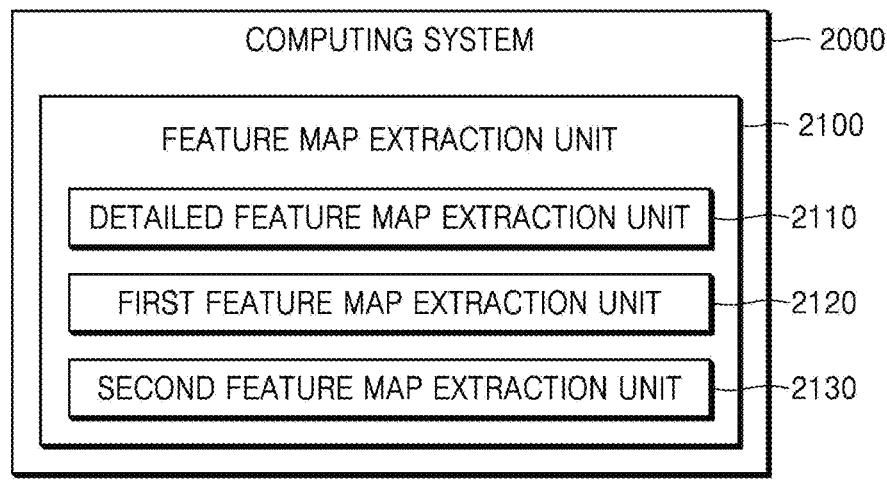

FIGS. 11A and 11B schematically show all steps of a method of generating feature map information according to one embodiment of the present invention.

The method of generating feature map information used for extracting object boundary information according to one embodiment of the present invention is performed in a computing system including at least one processor and at least one memory, and includes: a detailed feature map extraction step (S210) of extracting a plurality of detailed feature maps from a target image using a feature map generation artificial neural network module; a first feature map generation step (S220) of generating a first feature map having a plurality of channels based on merging the detailed feature maps; and a second feature map generation step (S230) of generating a second feature map having a plurality of channels by pooling the first feature map to lower a resolution and merging additional information including motion vector information having a direction and a size to an object boundary of each pixel or pixel group at the pooled resolution.

Preferably, the motion vector information is generated based on the learned motion vector artificial neural network module.

Steps S210, S220 and S230 shown in FIG. 11(A) may be performed by a detailed feature map extraction unit 2110, a first feature map extraction unit 2120, and a second feature map extraction unit 2130 of FIG. 11(B), respectively. The computing system may include a plurality of physical sub-computing systems. For example, a user terminal and a server system may be included in the computing system. The detailed feature map extraction unit 2110, the first feature map extraction unit 2120, and the second feature map extraction unit 2130 may be distributed and implemented by computing devices having physically different processors and memories, respectively.

In addition, each of the detailed feature map extraction unit 2110, the first feature map extraction unit 2120, and the second feature map extraction unit 2130 also may be implemented in a distributed manner by computing devices having physically different processors and memories, respectively, for each partial function.

Step S210 includes performing: a detailed feature map extraction step of extracting a plurality of detailed feature maps from the target image by using the feature map generation artificial neural network module.

The feature map generation artificial neural network module includes at least one learned filter and the detailed feature maps may be generated from the target image through the filter. As described above, the above target image may correspond to an entire original image or only a specific part cropped with a bounding box from the original image.

Step S220 includes performing a first feature map generation step of generating a first feature map having a plurality of channels based on the merging detailed feature maps.

The detailed feature maps may have different resolutions, and the detailed feature maps having the different resolutions may be adjusted and merged in step S220. In addition, instead of merging the entire detailed feature maps, only some of the information of the detailed feature map may be selected and merged. Even information lost in the intermediate step is included in the first feature map through the above way, so that the accuracy of extracting the boundary information of the object thereby may be increased thereafter.

Step S230 includes performing a second feature map generation step (S230) of generating a second feature map having a plurality of channels by pooling the first feature map to lower a resolution and merging additional information including motion vector information having a direction and a size to an object boundary of each pixel or pixel group at the pooled resolution.

According to the present invention, the information extracted from the motion vector artificial neural network, which is learned separately from the learned feature map generation artificial neural network module and extracting feature information from the target image itself performed in step S210, is additionally merged in order to extract boundary information of the object.

In that way, the feature map includes the feature information extracted from the target image itself as well as the motion vector information to the boundary line of the target extracted from the separately provided learned artificial neural network model, so that the efficiency and accuracy of calculations may be more remarkably improved upon extracting the object boundary information afterward.

Figure 12:
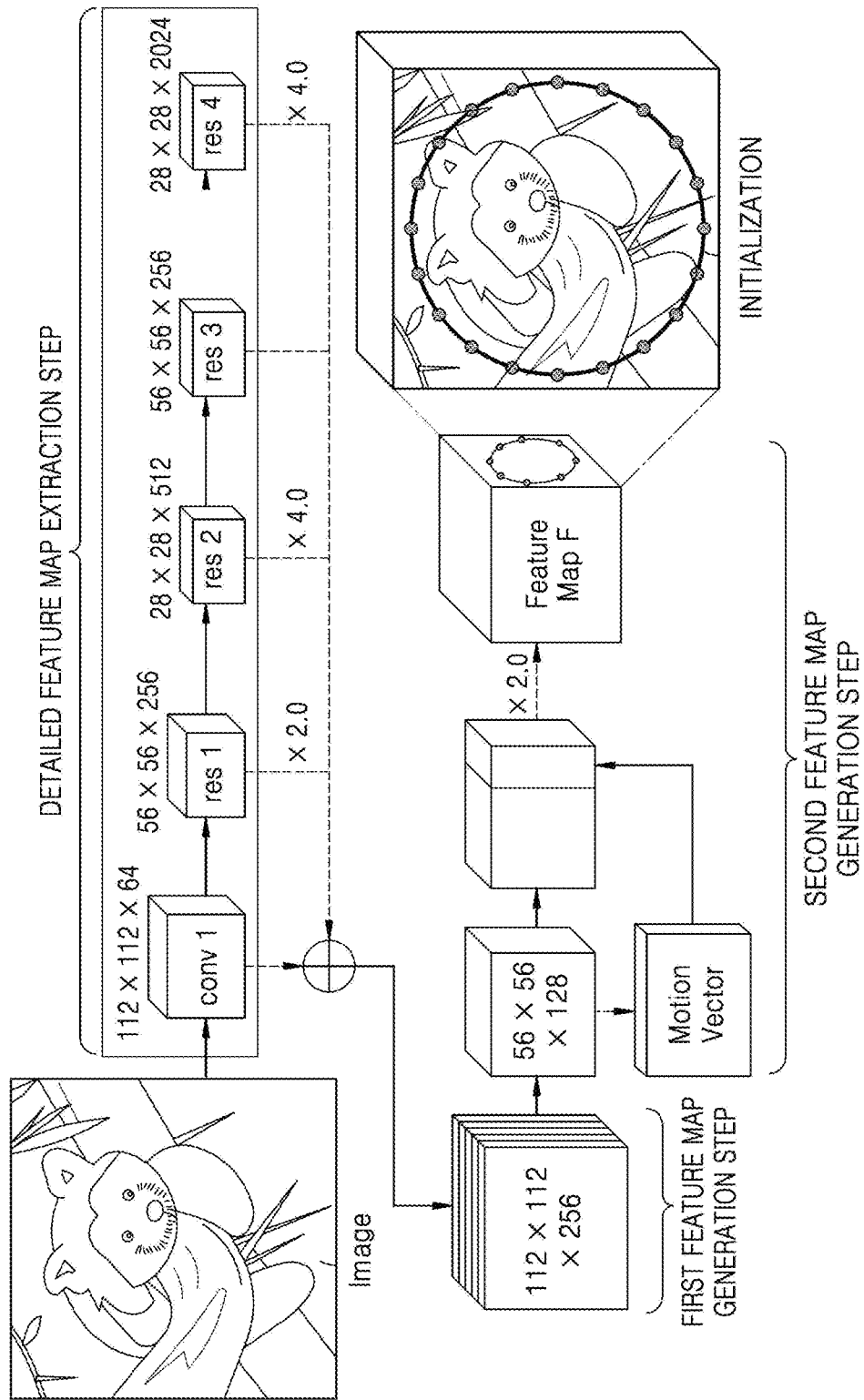
FIG. 12 exemplarily shows detailed processes of generating the feature map information according to one embodiment of the present invention.

FIG. 12 exemplarily shows detailed processes of generating the feature map information according to one embodiment of the present invention.

According to the embodiments of the present invention, in the detailed feature map extraction step, two or more detailed feature maps having different resolutions are generated, and in the first feature map generation step, one or more detailed feature maps are adjusted to a preset resolution by linear interpolation and merged, so that the first feature map is generated.

The embodiment shown in FIG. 12 will be described as an example. A detailed feature map #1 represented by conv1 is derived from a target image occupied by an animal in a significant area. The detailed feature map #1 has a flat resolution of 112×112 and has 64 channels. Then, the detailed feature map #2 res1 is derived from the detailed feature map #1. Then, the detailed feature map #3 res2 is derived from the detailed feature map #2. Then, the detailed feature map #4 res3 is derived from detailed feature map #3 res2). Then, the detailed feature map #5 res4 is extracted from the detailed feature map #4.

Then, the first feature map is generated by concatenating some or all of the detailed feature maps. Since the detailed feature map has the same or decreased resolution in lower levels, all detailed feature maps may not have the same resolution.

Taking this into account, in the embodiments of the present invention, the detailed feature maps are converted to have a specific resolution and merged in a unit of channel, so that the first feature map may be generated.

In addition, according to the present invention, some of the derived detailed feature maps may be excluded rather than merging all of the derived detailed feature maps. In the embodiment shown in FIG. 12, the feature map marked as res3 is exemplarily excluded from merging.

Each of the detailed feature maps includes a plurality of channels. Preferably, in the first feature map generation step, only some channels among the channels of each detailed feature map may be extracted and merged using the learned artificial neural network, so that the first feature map is generated.

The artificial neural network for selecting only some channels in the above manner, as a result, may be included in the feature map generation artificial neural network module or separately provided. In the above manner, more relevant information may be extracted when the boundary information of the object is extracted.

For example, in the embodiment shown in FIG. 12, the total number of channels may be 3880 (64+256+512+1024+2024). In the embodiment shown in FIG. 12, only 256 channels were selected therefrom and generated as the first feature map.

Meanwhile, in the second feature map generation step, the second feature map is generated by adding (e.g., CONCAT) motion vector information to the first feature map generated in the first feature map generation step as described above.

Preferably, the second feature map may be generated as shown in FIG. 12, by compressing (pulling) a two-dimensional resolution of the feature map via interpolation or the like and merging the motion vector according to the compressed resolution into the first feature map, instead of using the first feature map as it is.

Preferably, the motion vector information may be derived by the motion vector artificial neural network module using a target image as an input value, and the motion vector information includes information about the direction and size of each pixel or pixel group to a specific point on the object boundary at the shortest distance, finally, for each pixel or pixel group in the pooled two-dimensional resolution (56×56 in FIG. 12).

The above motion vector information corresponds to the motion vector information described with reference to FIG. 4.

Preferably, the motion vector artificial neural network module includes at least one of one or more convolutional layers and one or more fully connected (FC) layers.

The motion vector artificial neural network module basically exists separately from the feature map generation artificial neural network module, and is trained in a different way. In addition, it differs in that the motion vector artificial neural network module generates a final conclusion in a specific way. In addition, it differs in that the detailed feature map information included in the first feature map is derived from the detailed feature map of the previous step except for the detailed feature map #1, but the motion vector information is basically extracted from the target image itself.

The motion vector information is derived by the motion vector artificial neural network module using the target image as an input value, and includes information about the direction and size of each pixel or pixel group to a specific point on the object boundary at the shortest distance for each pixel or pixel group at the pooled resolution.

Meanwhile, in the second feature map generation step, a process of restoring the resolution of the second feature map may be performed again as shown in FIG. 12. The second feature map generated in the above manner has feature information for each pixel (when the two-dimensional resolution of the feature map is the same as the target image) or pixel group (when the two-dimensional resolution of the feature map is different from the target image). The above second feature map includes information selected from the entire target including even information lost in the intermediate steps unlike general CNN-based methods, and includes motion vector information from each point extracted from the separate learned artificial neural network module to the boundary.

The above second feature map includes information on the concept of a motion vector to the boundary in addition to high-level semantic information for each point of the target image, so that a strong effect can be exerted in the polygon method, upon extracting the object boundary information, in which the object boundary information has a plurality of control points.

Figure 13:
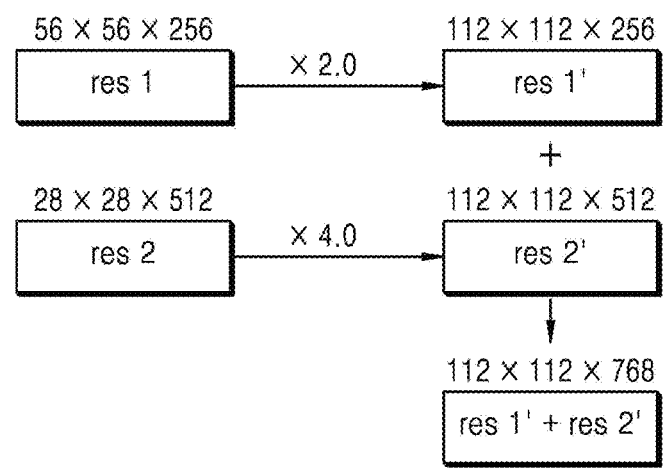
FIG. 13 schematically shows a process of merging detailed feature maps according to one embodiment of the present invention.

FIG. 13 schematically shows a process of merging detailed feature maps according to one embodiment of the present invention.

As described above, the detailed feature map extraction step generates two or more detailed feature maps with different resolutions. Then, in the first feature map generation step, one or more detailed feature maps are adjusted to a preset resolution by linear interpolation and merged, so that the first feature map is generated.

As shown in FIG. 13, the feature map indicated by res1 has the resolution expanded twice by interpolation, the feature map indicated by res2 has the resolution expanded 4 times, and thus each detailed feature map is sorted in resolution.

Then, channels of res1 and res2 having the sorted resolutions may be merged with each other so as to be integrated into one feature map.

Figure 14A:
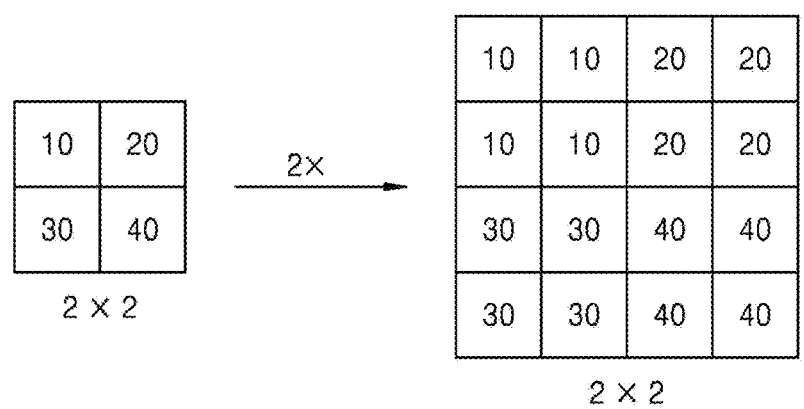
FIGS. 14A and 14B schematically show a linear interpolation scheme of the feature map according to one embodiment of the present invention.
Figure 14B:
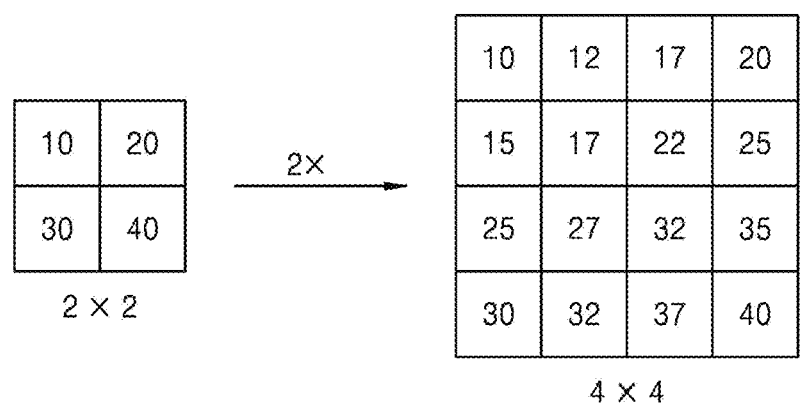

FIGS. 14A and 14B schematically show a linear interpolation scheme of the feature map according to one embodiment of the present invention.

According to the present invention, important information is selected from the feature maps in the intermediate steps rather than excluding the feature map extracted in the intermediate steps from determination, so that the first feature map is finally generated.

Meanwhile, the first feature map has a specific resolution. As described later, when the object boundary information is extracted due to the movement of control points, the first feature map is required to have coordinates of a pixel or pixel group corresponding to the motion vector of the target image or the target image itself.

Accordingly, in the present invention, since the detailed feature map is required to be merged while maintaining the coordinate information, the resolutions of the detailed feature maps with different resolutions are sorted to a specific single resolution using interpolation.

The form shown in FIG. 14(A) corresponds to an interpolation method in which values of previous corresponding pixels are used in a matrix having an expanded resolution when the resolution is expanded.

Meanwhile, the form shown in FIG. 14(B) corresponds to a form in which the resolution of a matrix (which may correspond to a two-dimensional element of a feature map) is expanded by using a bilinear interpolation. FIG. 14(B) may have smoother values at the boundary between the values, and accordingly, the accuracy in subsequent calculations may be achieved. In other words, calculation errors due to the resolution expansion may be prevented.

Figure 15:
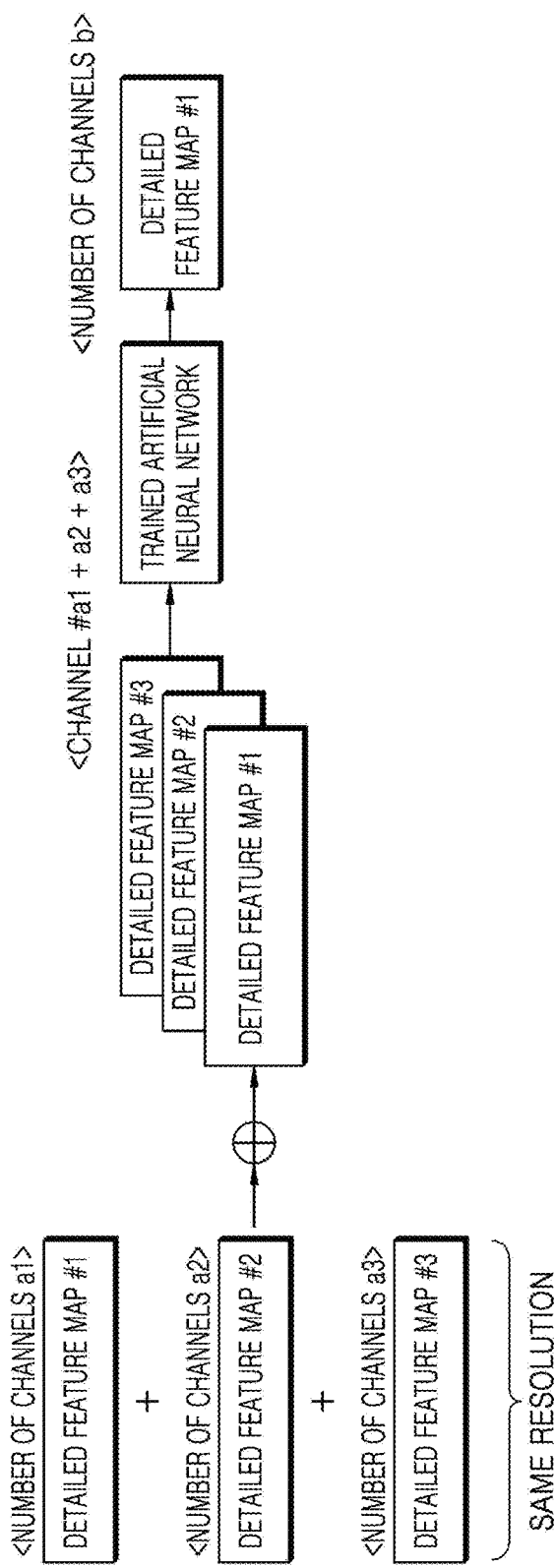
FIG. 15 schematically shows steps of generating a first feature map from the detailed feature map according to one embodiment of the present invention.

FIG. 15 schematically shows steps of generating a first feature map from the detailed feature map according to one embodiment of the present invention.

Each of the detailed feature maps includes a plurality of channels. In the first feature map generation step, only some channels among the channels of each detailed feature map may be extracted and merged using the learned artificial neural network, so that the first feature map is generated.

Specifically, as shown in FIG. 15, the detailed feature maps are sorted to have the same resolution even if the number of channels is different. Then, the detailed feature maps sorted in resolution are merged into one feature map matrix by merging channels.

Then, first feature map is generated in the form of excluding some channels by the learned artificial neural network.

Figure 16:
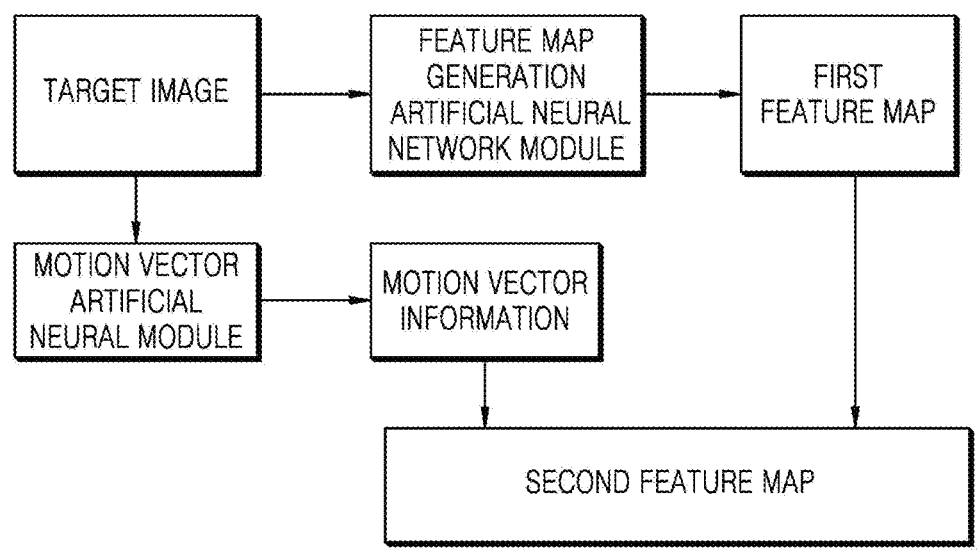
FIG. 16 schematically shows a process of generating a second feature map according to one embodiment of the present invention.

FIG. 16 schematically shows a process of generating a second feature map according to one embodiment of the present invention.

As shown in FIG. 16, the target image is inputted to the feature map generation artificial neural network module, and the first feature map is generated according to the above-described steps.

In addition, the target image is inputted to the motion vector artificial neural network module, and generated as motion vector information according to the above-described steps.

Then, the first feature map and motion vector information are merged to each other, so that the second feature map is generated.

Figure 17A:
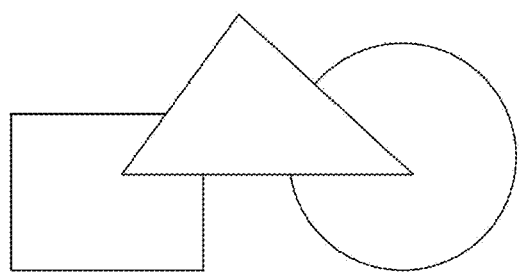
FIGS. 17A and 17B schematically show a pre-processing process of a target image according to one embodiment of the present invention.
Figure 17B:
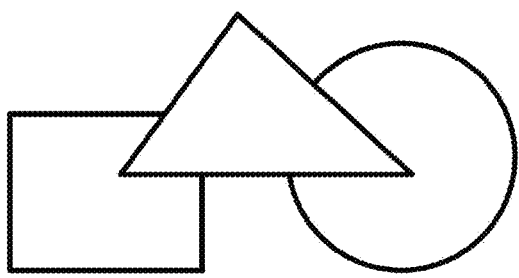

FIGS. 17A and 17B schematically show a pre-processing of a target image according to one embodiment of the present invention.

The motion vector artificial neural network module is learned by learning data labeled with the motion vector to the object boundary. The above motion vector artificial neural network module has the FC layer, thereby deriving a motion vector result value itself from each point of the target image to the object boundary.

In the exemplary embodiment of the present invention, in order to more accurately detect the motion vector information, the motion vector information is derived by inputting the target image pre-processed with edge-thickening into the motion vector artificial neural network module.

FIG. 17(A) shows an example of the target image before the pre-processing is performed, and FIG. 17(B) shows an example of the target image after the pre-processing is performed. The above image processing may be performed in a manner such as edge detection followed by image processing for edges, or may be implemented by a Gaussian filter or the like.

In the above manner, the operation accuracy of the motion vector artificial neural network module based on the convolutional layer may be further improved.

Figure 18:
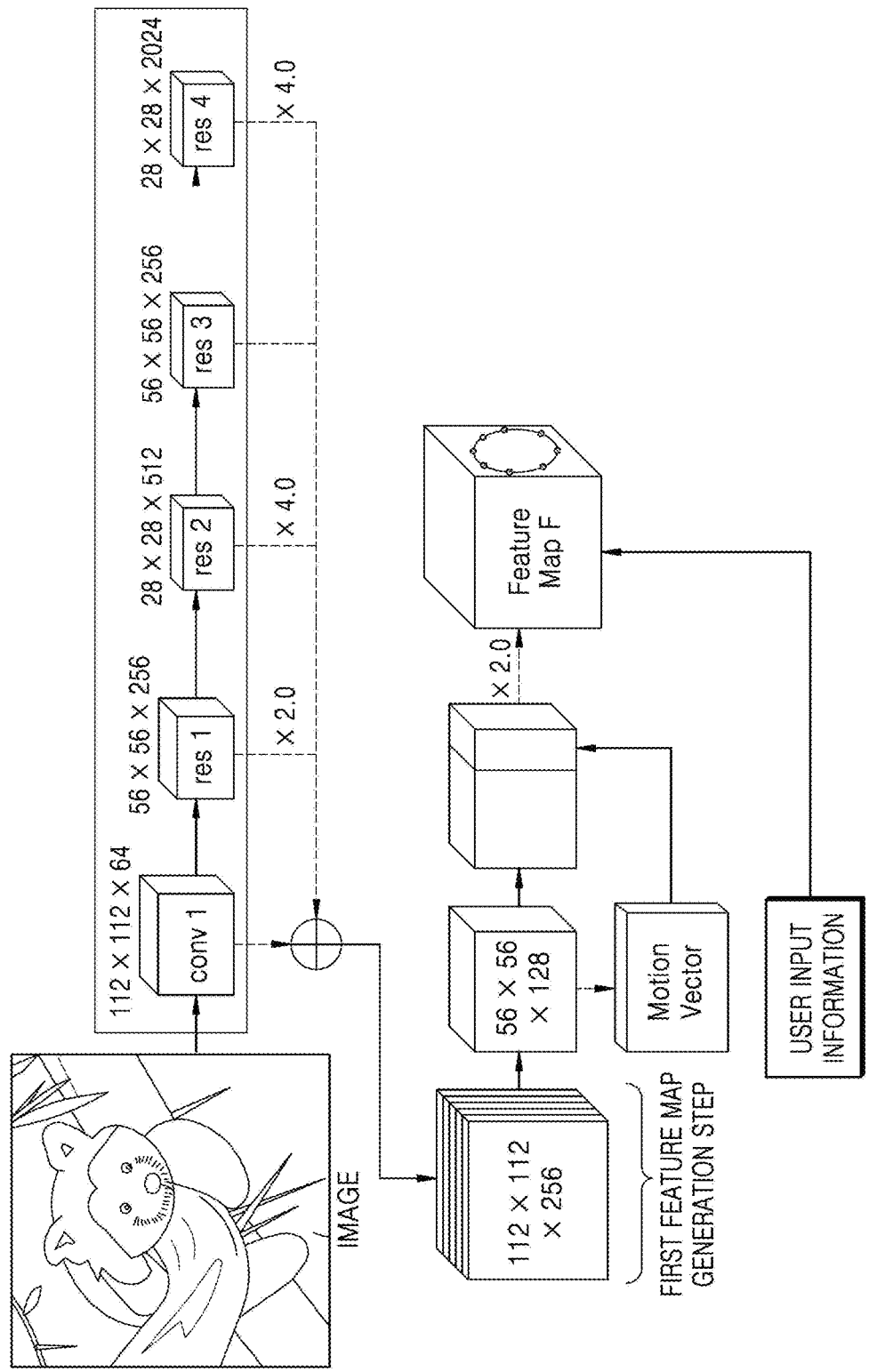
FIG. 18 schematically shows a process of generating feature map information to which user input information is added according to one embodiment of the present invention.

FIG. 18 schematically shows a process of generating feature map information to which user input information is added according to one embodiment of the present invention.

According to one embodiment of the present invention, the second feature map may further include information about the object boundary manually inputted by the user.

According to one embodiment of the present invention, when the object boundary information is defined by a plurality of control points and connection sequences thereof, modification information for the position movements of one or more control points or the connection sequences may correspond to the user input information. This includes input information about an individual control point, and may also include, for example, position movement information of the control points according to a user input for a specific scenario of changing 2 or more control point groups (for example, in the case when a selection tab marked as "To enlarge an object area defined by control points" is provided and selected).

In this case, when the additional information is added, the second feature map may include information about some kind of ground truth for the object. The above second feature map may additionally use the information inputted by the user, so that more efficient calculations may be performed in deriving the boundary information of the object based on the artificial neural network.

Figure 19:
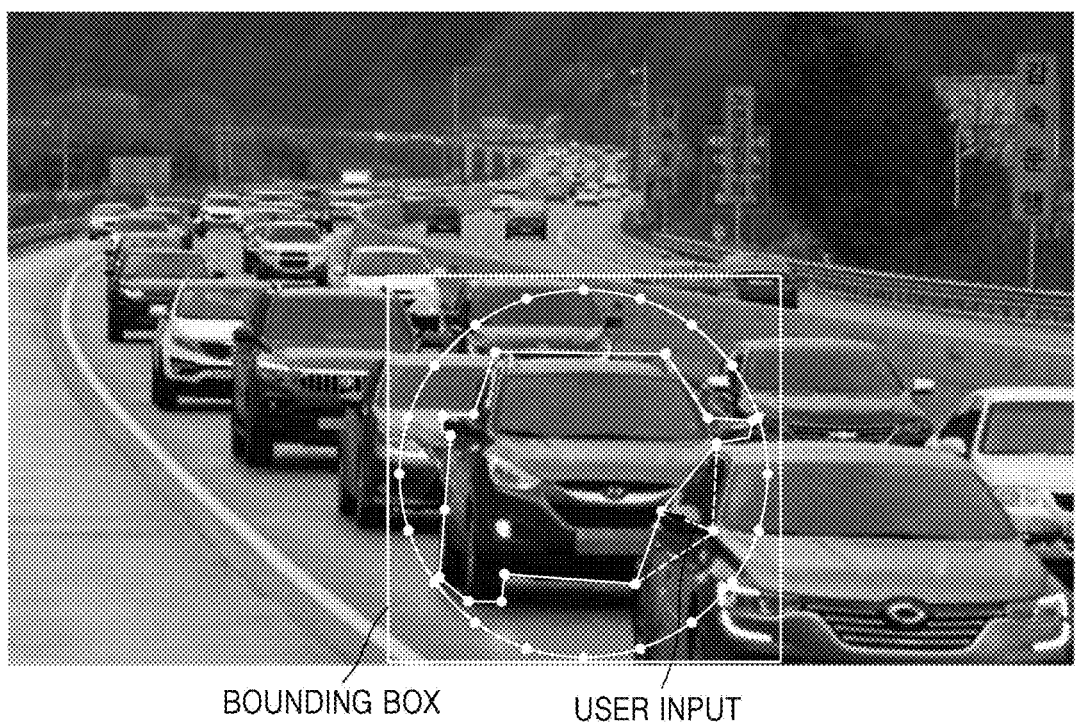
FIG. 19 schematically shows an example of user input information according to one embodiment of the present invention.

FIG. 19 schematically shows an example of user input information according to one embodiment of the present invention.

According to one embodiment of the present invention, the object boundary information includes information about a plurality of control points positioned on a boundary of an object, and the additional information includes information about a position movement of at least one control point. In the embodiment shown in FIG. 19, the first feature map is generated for an area designated by a bounding box in the entire image, and the second feature map is primarily generated while considering the motion vector and the information of the image itself for the area designated by the bounding box.

Then, the boundary of the object may be primarily extracted based on the generated second feature map by the above-described artificial neural network models, and the boundary may be displayed on the target image using control points and connection sequences thereof.

When an error occurs in some control points automatically generated (in the case of FIG. 19, some vertices of another vehicle are determined as the control points when the target object is obscured by another vehicle), the user may change a position of the control point having the error to a specific position, and information related to the user's behavior in the above manner may correspond to the above-described additional information.

Figure 20:
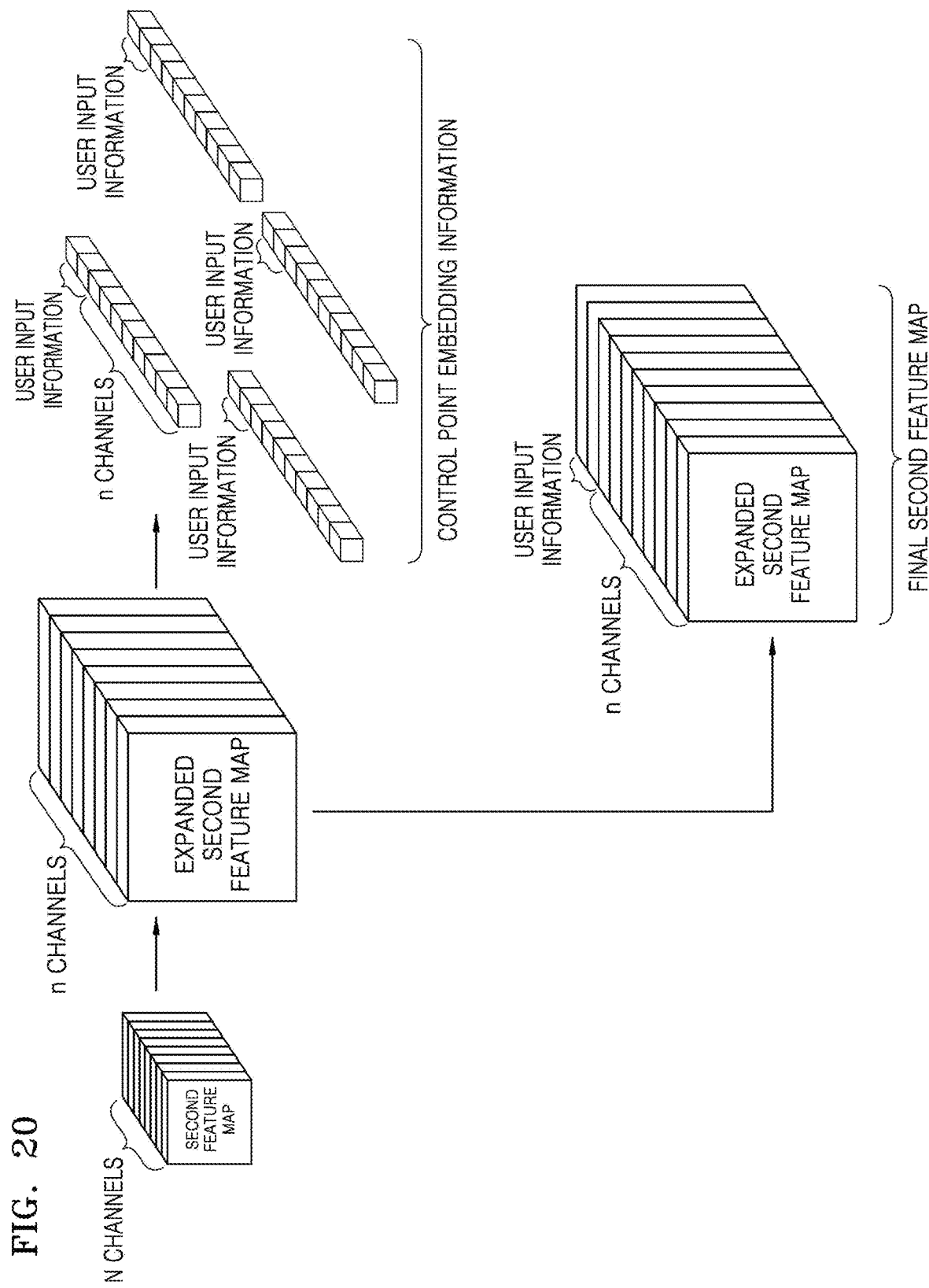
FIG. 20 schematically shows a process of generating control point embedding information and a final second feature map from the second feature map according to one embodiment of the present invention.

FIG. 20 schematically shows a process of generating control point embedding information and a final second feature map from the second feature map according to one embodiment of the present invention.

The object boundary information includes information about a plurality of control points positioned on a boundary of an object. In addition, the method of generating the feature map information according to the embodiments of the present invention may further include a control point position change step of controlling a position of the control point such that the control point is adjacent to the boundary line of the object, by inputting the second feature map and the object boundary information into the learned graph composition artificial neural network.

Meanwhile, according to one embodiment of the present invention, as shown in an upper right corner of FIG. 20, the feature map information inputted to the graph composition artificial neural network may include control point embedding information including feature information at a corresponding position of the second feature map for currently set control points and user change information for the corresponding control points (for example, control point movement information by the user).

Alternatively in another embodiment of the present invention, as shown a lower right corner of FIG. 20, the feature map information inputted to the graph composition artificial neural network may be obtained by integrating entire second feature map information and entire user change information (e.g., the control point movement information of the user).

In this case, a value of a channel through which user input information after n channels of the expanded final second feature map corresponding to a point in which a control point is not positioned, the control point is positioned, or the control point is not changed (for example, 2 channels after n channels when the additional information includes x-axis movement information and y-axis movement information of the control point by the user) may be set to a preset value such as 0.

Figure 21A:
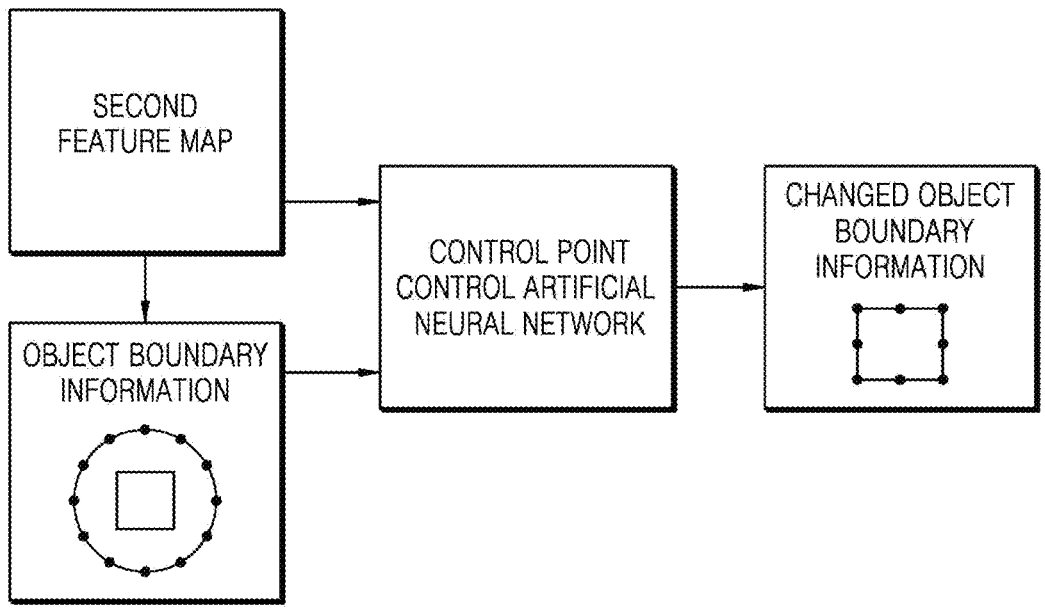
FIGS. 21A and 21B schematically show the operation of the control adjustment artificial neural network according to one embodiment of the present invention.
Figure 21B:
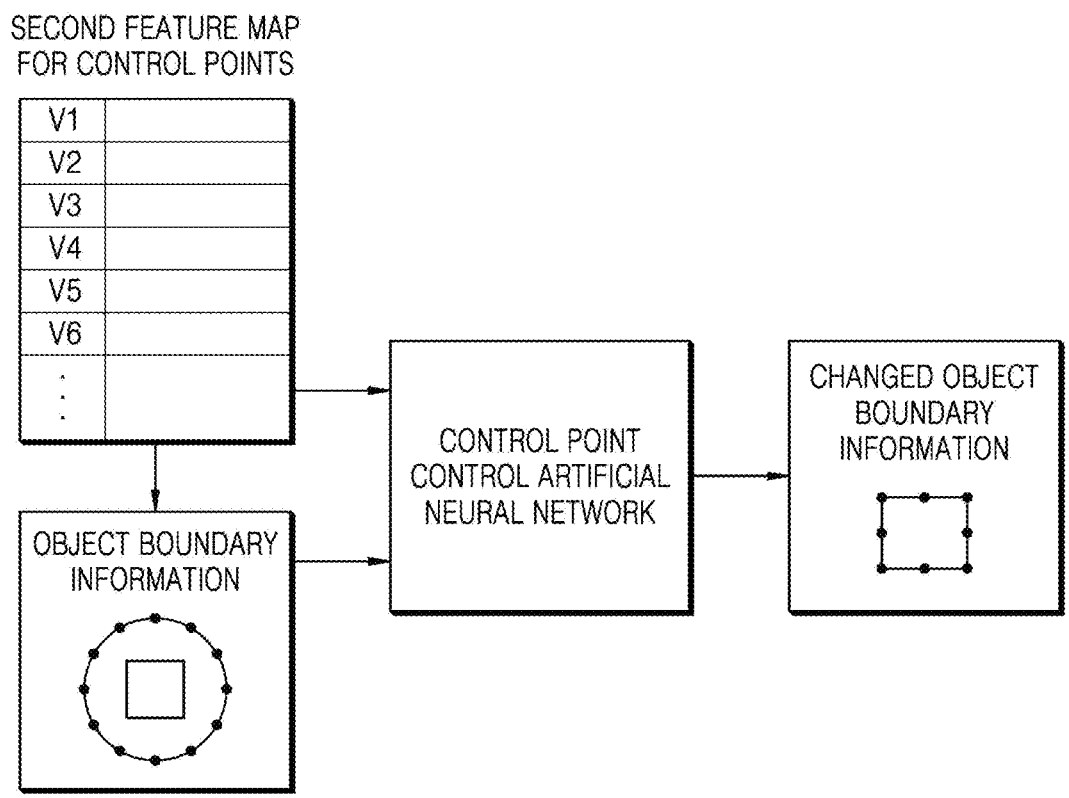

FIGS. 21A and 21B schematically show the operation of the control adjustment artificial neural network according to one embodiment of the present invention.

The operation shown in FIG. 21 may correspond to the control point position change step S20 in FIG. 1. According to one embodiment of the present invention, the control point adjustment artificial neural network module controls the object boundary information defined as information including the control points so as to be positioned at the boundary of the object, based on the second feature map generated by the aforementioned feature map generation artificial neural network module corresponding to the final feature map extracted in the aforementioned feature map extraction step (S10), and the object boundary information changed in the initial or previous step.

As shown in FIG. 21(A), according to one embodiment of the present invention, the positions of the control points may be changed by inputting the second feature map for the entire area of the target image. However, as shown in FIG. 21(B), in another embodiment of the present invention, the control points may be operated so as to be positioned at the boundary of the object by inputting the second feature map in the area corresponding to the control point position updated in the initial or previous step in the target image, that is, the second feature map for the control points.

In this case, the second feature map for the control points may also include information on surrounding control points. In addition, as described above, the motion vector information derived from the motion vector artificial neural network module is basically included in the second feature map for the control points.

FIGS. 22A, 22B and 22C exemplarily show a process of improving the accuracy of the object boundary information according to one embodiment of the present invention.

The object boundary information defined by positions of the control points and connection sequences thereof may be primarily derived through steps S10 and S20 in FIG. 1. The method of improving the accuracy of the object boundary information described later may be applied to schemes using other types of artificial neural network modules and rules, in addition to deriving the object boundary information according to the above-described method, and may also be applied to the object boundary information manually inputted by a human.

For example, even when the control points and the connection sequences thereof are primarily determined by a person directly inputting positions of the control points or changing the positions from initial positions, the process of improving the accuracy of the object boundary information according to the embodiments of the present invention may be performed in the same manner.

The process corresponds to the process described with reference to FIGS. 6 to 9, and some repetitive descriptions will be omitted.

As shown in FIG. 22(A), the entire image is given and the bounding box may be determined automatically or manually. Alternatively in another embodiment of the present invention, the entire image itself may correspond to the target image.

Then, the object boundary information may be defined by control points and sequences thereof manually or automatically based on the above-described feature map-based artificial neural network module. The object boundary information primarily determined as described above is shown in FIG. 22(B).

FIG. 22(C) shows a form in which the object boundary information is automatically improved by the operation according to the method of improving the accuracy of the object boundary information according to the embodiments of the present invention.

In FIG. 22(C), when a car is a main object and a part of the car is obscured by a tree, the method of improving the accuracy of the object boundary information of the present invention extracts the object boundary information by automatically excluding the tree portion.

In the embodiment of the present invention, the object boundary information may be defined by positions of the control points and connection sequences of the control points. In the above environment, in the embodiment of the present invention, the connection sequences are changed by the method of improving the accuracy of the object boundary information, so that the object boundary information may be improved. In the embodiments of the present invention, some of the connection sequences may be removed, and accordingly, a connection sequence may be automatically generated from the control point, from which the connection sequence has been removed, to another control point. This is configured to form a closed loop as a result by defining an object area. According to one embodiment of the present invention, the closed loop may be formed by generating a connection sequence at any one of the control points adjacent to the control point from which the connection sequence is removed.

In other words, in the connection sequence change step in the method of improving the accuracy of the object boundary information according to the present invention the connection sequence of the control points may be changed, such that the part obscured by another object is excluded from the object defined by the connection sequence of the control points when the object in the target image is obscured by another object.

Figure 23:
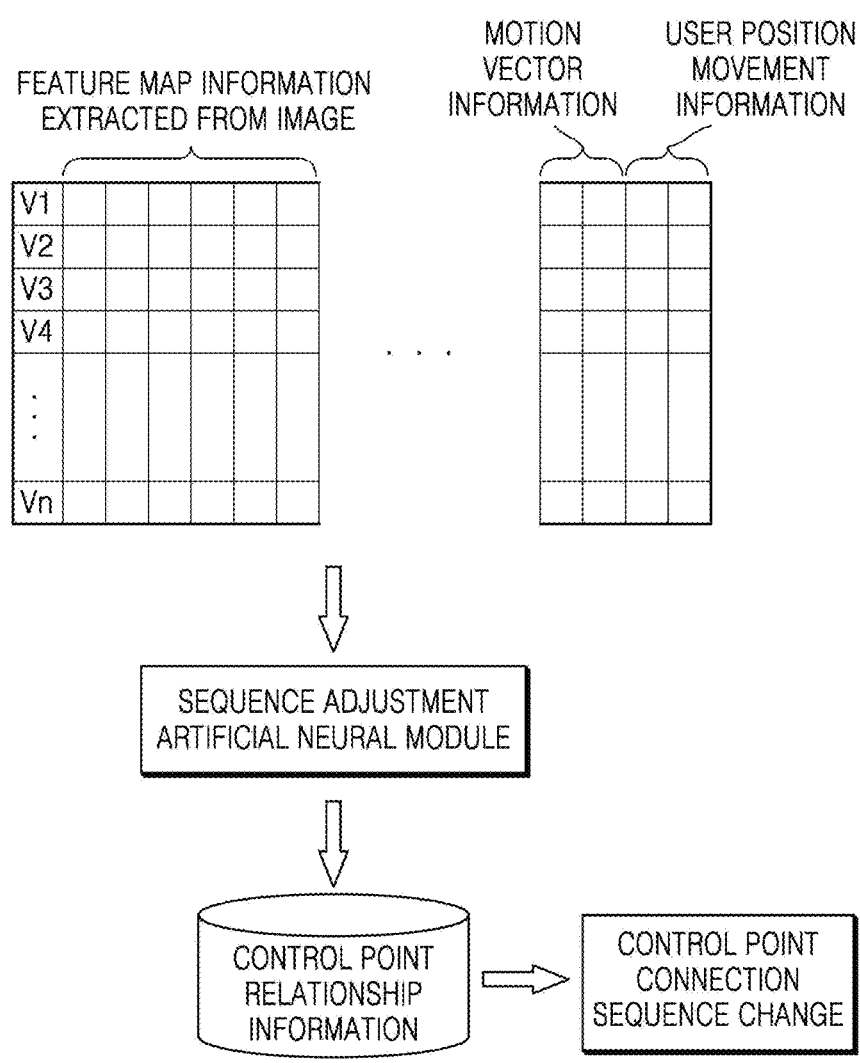
FIG. 23 schematically shows the operation of the sequence adjustment artificial neural network module according to one embodiment of the present invention.

FIG. 23 schematically shows the operation of the sequence adjustment artificial neural network module according to one embodiment of the present invention.

The method of improving the accuracy of the object boundary information according to one embodiment of the present invention is performed by a computing system having one or more processors and one or more memories.

In the embodiments of the present invention, the object boundary information includes information on positions of a plurality of control points and information on connection sequences of the control points. The object boundary information is defined in the above special manner, the object boundary information defined in the above manner is primarily derived by an arbitrary method, and then, the method of improving the accuracy of the object boundary information according to one embodiment of the present invention is implemented.

As shown in FIG. 23, a relation information derivation step, of deriving relation information between a plurality of control points by using the sequence control artificial neural network module learned from the feature map information including information derived by the learned artificial neural network module for each pixel or pixel group corresponding to each of the control points, is performed.

Then, a connection sequence changing step, of changing connection sequences of the control points based on the relationship information, is performed.

As described above, in the connection sequence change step, the connection sequences of the control points are changed, such that the part obscured by another object is excluded from the object defined by the connection sequence of the control points when the object in the target image is obscured by another object.

As shown in FIG. 23, the method of improving the accuracy uses the feature information on the pixel or pixel group generated by the above-described method or the like. In other words, only the information on the primarily derived control points is considered instead of using the entire feature map information, and accordingly, the accuracy of the information of the object boundary area may be improved not by changing positions of the control points, but by changing connection sequences between the control points. The feature map basically includes feature map information extracted from the image itself.

Further, in one embodiment of the present invention as described above, the feature map information for the pixel or pixel group may include motion vector information including information about the direction and size of each pixel or pixel group to a specific point on the object boundary at the shortest distance.

As described above, according to one embodiment of the present invention, the feature map information may include information on the object boundary manually inputted by the user (user position movement information).

The feature map information for the control points is inputted to the learned sequence adjustment artificial neural network module, and then, correlation information between the control points is outputted. The relationship information includes information such as dependency and similarity between the control points, and preferably, may include information on dependency between the control points. In one embodiment of the present invention, the dependence between the control points may be expressed in a numerical form.

Figure 24:
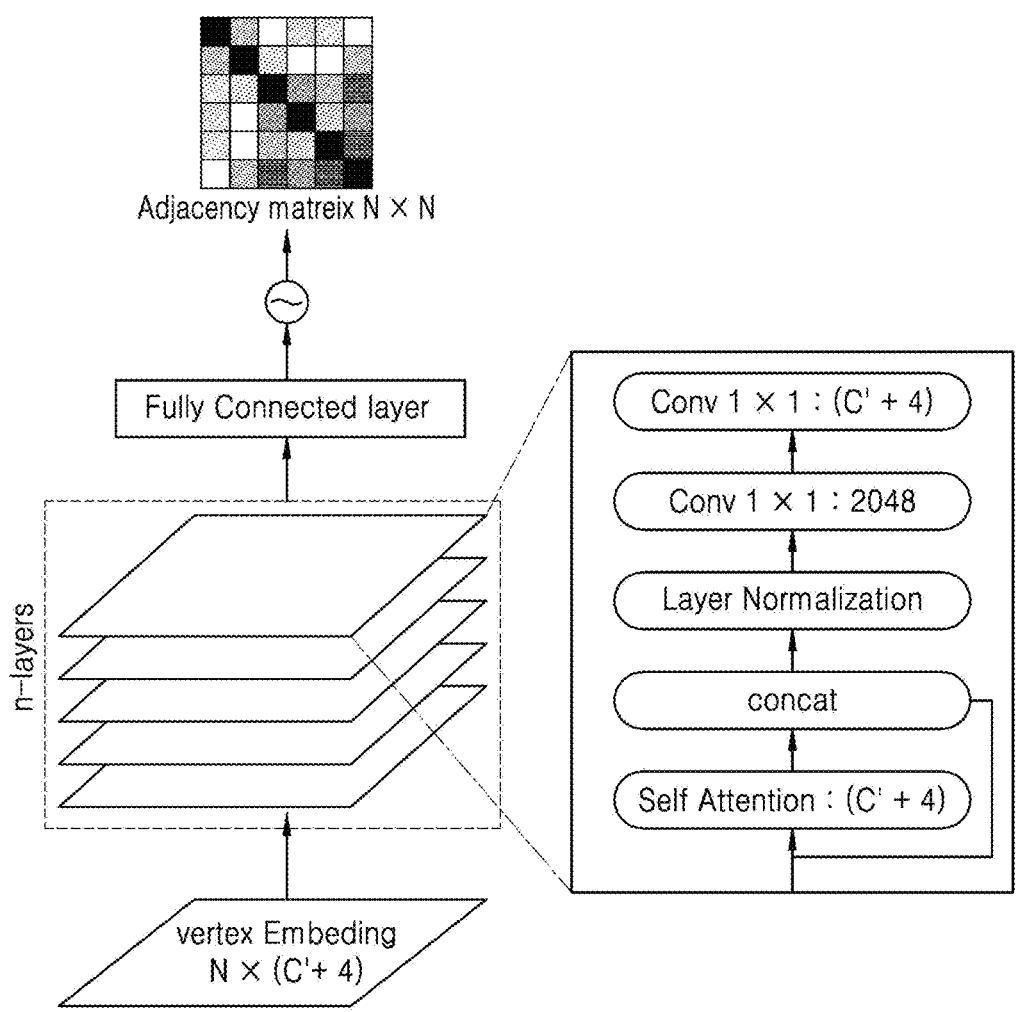
FIG. 24 schematically shows the detailed configuration of the sequence adjustment artificial neural network according to one embodiment of the present invention.

FIG. 24 schematically shows the detailed configuration of the sequence adjustment artificial neural network according to one embodiment of the present invention.

The portion marked with Vertex Embedding at the bottom corresponds to embedding information (feature map information) of the control points. The above control points may be regarded as kinds of vertices of the object. Meanwhile, the feature map information of the control points is inputted to the sequence adjustment artificial neural network.

As shown in FIG. 24, the sequence adjustment artificial neural network module includes a transformer module.

The transformer module of the sequence adjustment artificial neural network module includes a plurality of layers, and an output value from each layer is used as an input value for the next layer. The output value of the transformer module may be transferred to the FC layer, and finally, an adjacency matrix between the control points may be derived.

Meanwhile, attention information by self-attention is derived for inputted information at a layer of each transformer module, and the derived attention information is concatenated with the initial input value (feature map information about the control points in the case of the lowest layer, or an output value of the previous layer in the case of the next layer) and outputted.

Then, the layer normalization process is performed. Thereafter, convolution is performed with 2048 channels, and then convolution is performed to have the same dimension as feature map information (C' corresponds to the number of channels in the feature map extracted from the target image itself, and 2 out of 4 corresponds to motion vector information and 2 corresponds to user input information) so as to have the same dimension as the initial dimension, and then inputted to a layer of the next transformer module.

FIGS. 25A and 25B schematically show a part of a calculation process of the attention information derivation step according to one embodiment of the present invention.

According to the present invention, the connection sequences are modified (e.g., removed) in consideration of the similarity (or dependency) of the feature map information. The similarity information may be implemented in the form of an adjacency matrix, and feature map information related to the extraction of object boundary information is required to be derived to obtain the adjacency matrix.

According to one embodiment of the present invention, the above adjacency matrix is extracted by using a self-attention model.

In FIG. 25(A), a step is performed in which an operation Q-matrix Q(f) is derived by vector-multiplying the feature map information f and the learned Q-matrix WQ. In the above manner, the feature map information may be converted into a query vector.

In FIG. 25(B), a step is performed in which an operation K-matrix K(f) is derived by vector-multiplying the feature map information f and the learned K-matrix Wk. In the above manner, the feature map information may be converted into a key vector.

FIGS. 26A and 26B schematically show a part of a calculation process of the attention information derivation step according to one embodiment of the present invention.

As shown in FIG. 26(A) after the previous matrix operation shown in FIG. 25, a result value, which is obtained by vector-multiplying a transpose matrix of the operation Q-matrix and the operation K-matrix, is derived. The operation matrix derived in the above manner has a dimension of N×N (N is the number of control points).

Meanwhile, as shown in FIG. 26(B), an operation V-matrix V(f) is derived by vector-multiplying the feature map information f and the learned V-matrix Wv.

Figure 27:
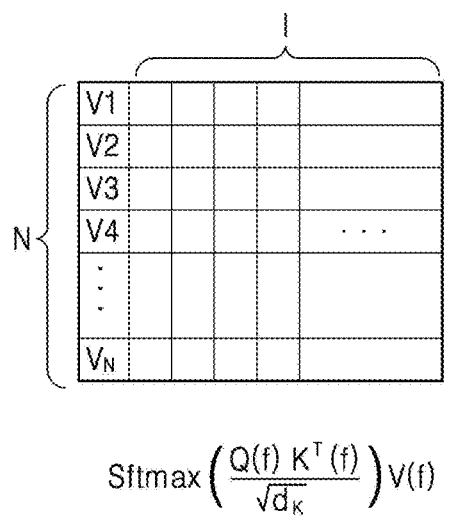

FIG. 27 schematically shows an operation product of the attention information derivation step according to one embodiment of the present invention.

The matrix shown in FIG. 27 corresponds to attention information, which corresponds to attention information on dependency information related to object boundary information. Dependency or relationship information between control points may be derived based on the attention information, and the connection sequences between control points may be changed based on the dependency or the relationship information.

The matrix shown in FIG. 27 may be expressed as the following expression.

$$\text{Softmax}\left(\frac{Q(f)K^T}{\sqrt{d_k}}\right)V(f)$$

Figure 28:
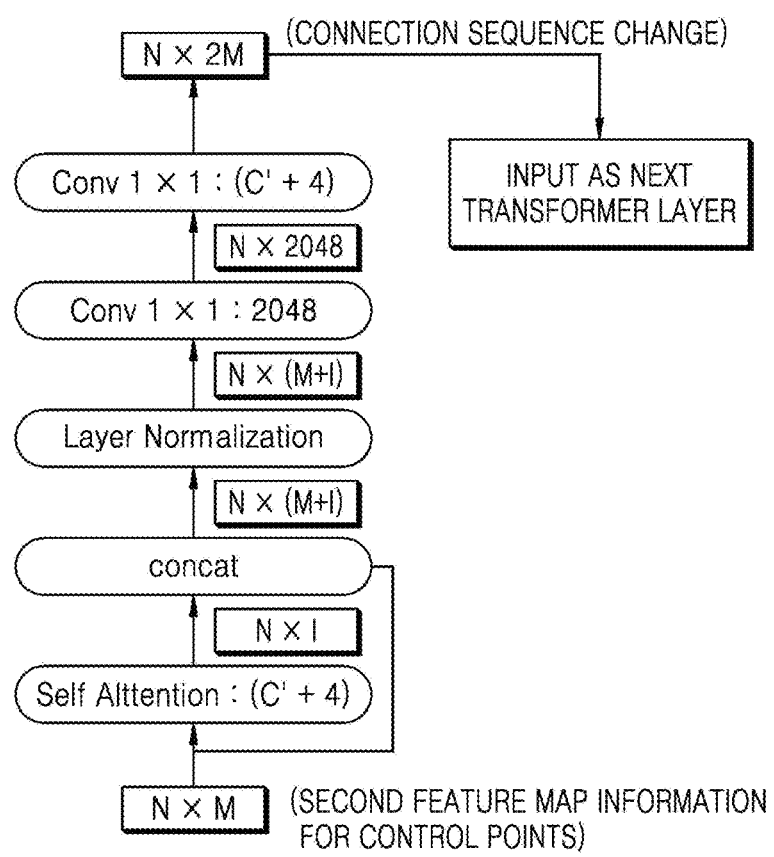
FIG. 28 schematically shows detailed processes of the intermediate feature map information derivation step according to one embodiment of the present invention.

FIG. 28 schematically shows detailed processes of the intermediate feature map information derivation step according to one embodiment of the present invention.

The process performed in the transformer module includes an intermediate feature map information derivation step of deriving intermediate feature map information having the same dimension as the feature map information by using a learned filter. After the intermediate feature map information derivation step is performed, the attention information derivation step is performed again by using the intermediate feature map information as an input value.

As described above, the feature map information for control points of N×M (M is the same as C'+4) is processed by the self-attention module, so that the attention information also extract the N×I matrix. Thereafter, the N×I matrix is concatenated with the initially inputted N×M matrix, so that the layer normalization is performed on the N×(M+I) matrix, and then convoluted with N×2048 and convoluted again with the same N×M as the initial dimension. Accordingly, the finally convoluted information is inputted to the next transformer layer.

Figure 29:
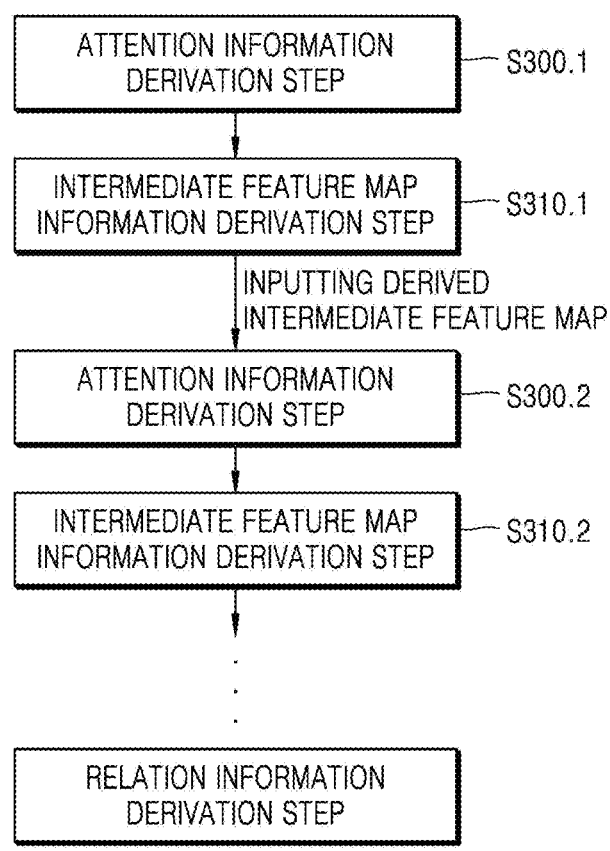
FIG. 29 schematically show the overall process of the relation information derivation step according to one embodiment of the present invention.

FIG. 29 schematically show the overall process of the relation information derivation step according to one embodiment of the present invention.

In step S300.1, the attention information derivation step described with reference to FIGS. 25 to 26 is performed. The steps may correspond to steps referred to as self-attention in FIG. 28.

Then, in step S300.2, the intermediate feature map information derivation step represented by CONCAT, layer normalization, Conv 1×1:2048, and Conv 1×1 (C'+4) of FIG. 18 is performed. The intermediate feature map generated in the above manner serves again as an input of the attention information derivation step.

The n-layers in the form shown in FIG. 24 correspond to layers on which the attention information derivation step and the intermediate feature map information derivation step are performed, the attention information derivation step and the intermediate feature map information derivation step are performed n times, and then, FC information is derived from the FC layer and processed to derive information on the adjacency matrix of N×N.

Figures 30A, 30B:
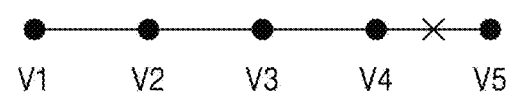
FIGS. 30A and 30B show an example of expressing the relationship information in the form of an adjacency matrix according to one embodiment of the present invention.

FIGS. 30A and 30B show an example of expressing the relationship information in the form of an adjacency matrix according to one embodiment of the present invention.

In the initial stage of the relation information derivation step, the A-th control point has a connection sequence with the (A−1)-th control point and the (A+1)-th control point. Then, the connection sequences may be changed based on the relation information between the control points derived by the relation information derivation step.

The relationship information includes a matrix having a dimension of N×N, and elements I and J of the matrix includes detailed relationship information between the I-th control point and the J-th control point.

The detailed relationship information may correspond to dependency information or similarity information. In other words, the points forming the object boundary are exhibited to have the detailed relationship information formed in a certain shape or exist within a predetermined range. However, some points, which do not define the boundary with respect to the points defining the object boundary may have detailed relationship information formed in a different shape or exist outside the predetermined range.

Accordingly, in the connection sequence change step, at least one connection sequence of the connection sequence between the (B−1)-th control point and the B-th control point, and the B-th control point and the (B+1)-th control point is removed based on detailed relationship information between the B-th control point and the (B−1)-th control point included in the relationship information, and detailed relationship information between the B-th control point and the (B+1)-th control point, with respect to B-th control point.

Specifically, when the (B−1)-th control point, the B-th control point, and the (B+1)th control point are all continuously positioned on the object boundary, the detailed relationship information or dependency score between the points is exhibited relatively high. For example, in the (B−1)-th control point and the (B+5)-th control point, the dependency score on each other appears relatively low.

In the adjacency matrix shown in FIG. 30, the dependence scores between the control points immediately before and after each control point are summarized as follows.

V1: 0.8(V2)
V2: 0.8(V1), 0.8(V3)
V3: 0.8(V2), 0.9(V4)
V4: 0.9(V3), 0.3(V5)
V5: 0.3(V4)

When a preset number (for example, a number given as 0.8 or a representative value of the dependency scores with the control points immediately before and after all control points (e.g., average value)) is set as a criterion, connection sequences between the control points may be deleted with respect to dependency scores between control points that fail to meet the criterion.

In FIG. 30, when the criterion is defined as 0.8, the connection sequence between V4 and V5 may be deleted since the dependency score between V4 and V5 is less than or equal to 0.8.

Accordingly, some connection sequences may be removed based on the dependency score inside the adjacency matrix. In addition, the connection sequences may be performed in various ways. For example, a method of newly forming a connection sequence itself between the corresponding control point and control points having first and second priority dependency scores may also be considered. In other words, the connection sequences may also be generated and modified by the adjacency matrix in addition to the deletion. For the above action, object boundary information including only the corresponding object may be derived while excluding noisy objects due to overlap/occlusion, motion blur, and the like.

Alternatively in another embodiment of the present invention, the connection sequences may be changed by relatively comparing dependency scores between each control point and other control points.

In another embodiment of the present invention, when assuming that V1 has a dependency score with V2, V3, V4, and V5, and the dependency score between V1 and V3 is higher than the dependency score between V1 and V2, the connection sequence may be changed to V1 and V3. In this case, V2 may be selectively excluded from the control points.

Alternatively in another embodiment of the present invention, the connection sequences may be changed according to the relative comparison rank of dependency scores with respect to other control points at each control point.

In another embodiment of the present invention, when assuming that V5 has a dependency score with V1 to V10, a control point having the highest dependency score with V5 among V1 to V4 may have a left-side connection sequence of V5, and a control point having the highest dependency score with V5 among V6 to V10 may have a right-side connection sequence of V5. The left and right search ranges may be defined according to a preset rule.

Figure 31:
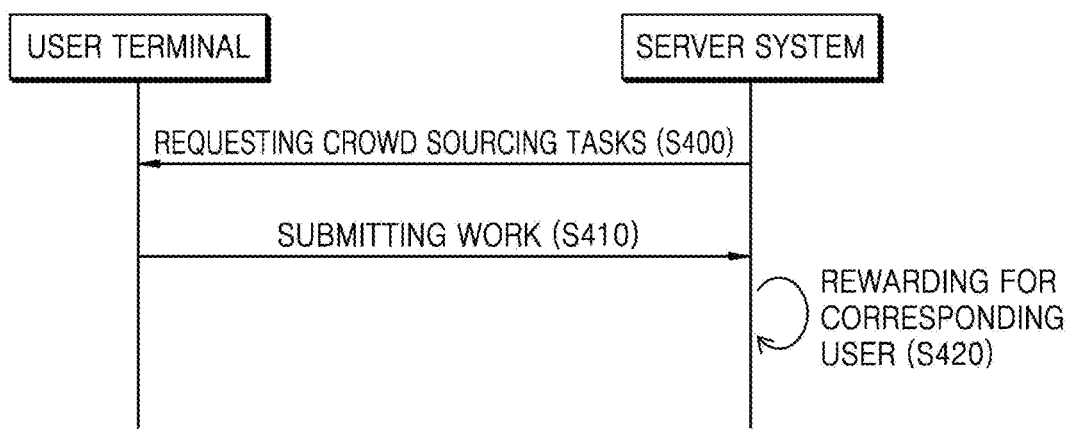
FIG. 31 schematically shows steps of crowd sourcing tasks for the boundary object information annotation input according to one embodiment of the present invention.

FIG. 31 schematically shows steps of crowd sourcing tasks for the boundary object information annotation input according to one embodiment of the present invention.

In step S400, the server system transmits the crowd sourcing work to the user terminal. When the crowd sourcing work is inputting object boundary information, information on an original image and work content may be transmitted in step S400.

Then, in step S410, the user terminal transmits the work including input information for object boundary information to the server system. In the above process, steps of the method of inputting annotation of object boundary information, which will be described later, may be performed.

Then, in step S420, a reward for the corresponding task is given to the corresponding user account or user terminal. In this case, the corresponding work may be reviewed or determined whether to meet a preset creation.

Figure 32:
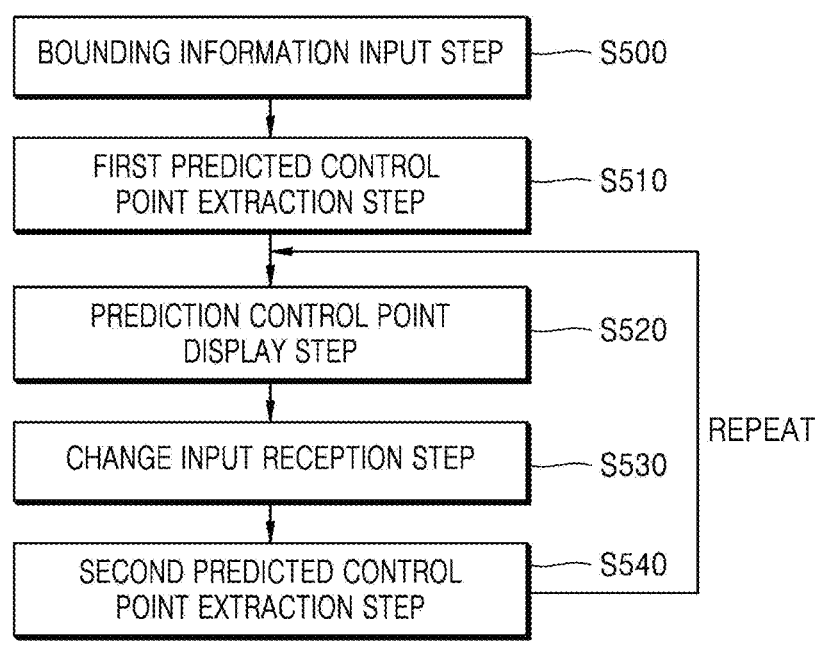
FIG. 32 schematically shows detailed steps of the method of inputting annotation of boundary information for an image according to one embodiment of the present invention.

FIG. 32 schematically shows detailed steps of the method of inputting annotation of boundary information for an image according to one embodiment of the present invention.

The method of inputting annotation of object boundary information for an image according to one embodiment of the present invention is performed in a computing system including at least one processor and at least one memory The method of inputting annotation of object boundary information for an image according to one embodiment of the present invention includes: a bounding information input step (S500) of receiving information on a bounding box inside the image from a user; a first prediction control point extraction step (S510) of extracting a plurality of control points related to a predicted object boundary from an image inside the bounding box by using a learned artificial neural network model; a predicted control point display step (S520) of overlaying and displaying the predicted control points on the image inside the bounding box in a form of having reciprocal connection sequences; and a change input reception step (S530) of receiving a position change input for at least one of the control points from the user.

Preferably, the method of inputting annotation of boundary information for the image may further include a second prediction control point extraction step (S540) of extracting a plurality of control points related to the predicted object boundary from an image inside the bounding box by using a learned artificial neural network model while additionally considering the position change input.

According to one embodiment of the present invention, the method may be entirely performed in the user terminal itself. However, S510 and S540, which correspond to preliminary processing based on an artificial neural network, may be performed in the server system and only the result thereof may be provided to the user terminal.

In steps S510 and S540, extraction of object boundary information, derivation of feature map information, and modification of sequence information for improving the accuracy of the object boundary information, as described with reference to FIGS. 1 to 30, may be performed as a detailed process, and some duplicate description thereof will be omitted.

Preferably, the first prediction control point extraction step (S510) or the second prediction control point extraction step (S540) includes: modifying positions of the control points so that the control points are close to the object boundary by inputting the feature map information extracted for each pixel or pixel group of the image inside the bounding box into the learned control point adjustment artificial neural network model, with respect to a plurality of control points having initially preset positions and connection sequences.

More preferably, in the first prediction control point extraction step (S510) or the second prediction control point extraction step (S540), when the object of the image inside the bounding box is obscured by another object, the connection sequences of the control points are changed by using the learned sequence adjustment artificial neural network model, such that the part obscured by another object is excluded from the object defined by the connection sequence of the control points.

Specifically, in the first prediction control point extraction step (S510) or the second prediction control point extraction step (S540), relational information between the control points is derived by the sequence adjustment artificial neural network module based on detailed information of the feature map information corresponding to the positions of the control points, and the connection sequences of the control points may be changed based on the relationship information.

Figure 33:
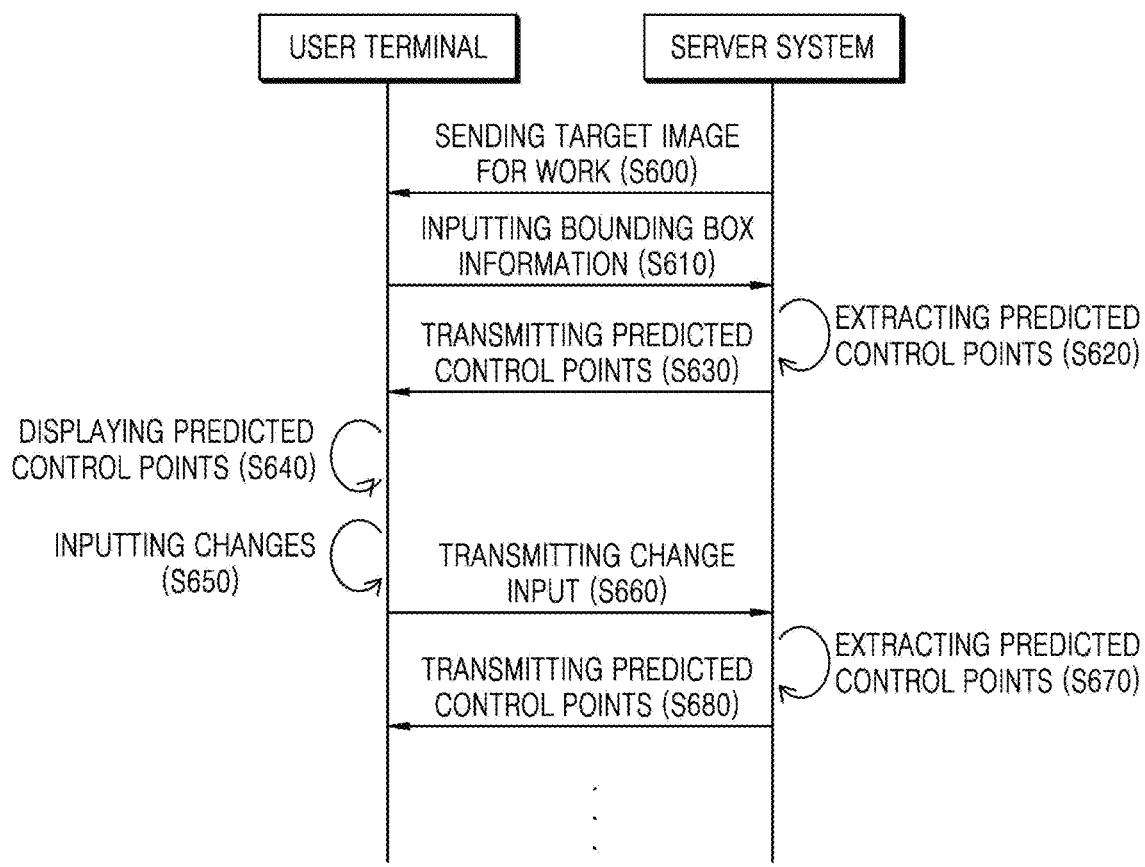
FIG. 33 schematically shows continuous execution steps of the method of inputting annotation of boundary information for the image according to one embodiment of the present invention.

FIG. 33 schematically shows continuous execution steps of the method of inputting annotation of boundary information for the image according to one embodiment of the present invention.

In step S600, a work target image is transmitted to the user terminal.

In step S610, bounding box information inputted by the user in the form of a box for the work target image is transmitted to the server system.

In step S620, predicted control points are extracted from the server system. According to one embodiment of the present invention, as described above, the feature map information may be derived based on the artificial neural network module from the target image defined by the bounding box, the positions of the initial control points may be adjusted based on the feature map information, and the connection sequence may be changed based on information such as dependence of feature map information of each control point. Alternatively, in another embodiment of the present invention, the prediction control points may be extracted in other schemes. The predicted control point extraction may be performed in the user terminal as well as in the server system.

In step S630, the extracted predicted control point, that is, information about the control points and the connection sequences is transmitted to the user terminal.

In step S640, the preliminarily derived object boundary information defined by the control points and the connection sequences is displayed on the user terminal. Preferably, as described above, the preliminarily derived object boundary information may be displayed and overlaid on the target image in the form of polygon-type boundary information defined by a plurality of control points and connection sequences.

In step S650, a change input for position movement of one or more of the control points may be performed. The change input may include not only moving positions of the control points, but also editing the connection sequences. For example, the editing may include removing a connection between specific control points, introducing a new connection sequence between specific control points, or changing a start point or an end point of the connection sequence.

In step S660, the change input is sent to the server system, the server system may derive again the object boundary information including the predicted control points and the connection sequence therebetween while considering the changed object boundary information, for example, the changed positions of the control points, and transmit the derived object boundary information to the user terminal (S680).

Then, the process corresponding to S640 and S650 may be performed again, and the user finally may enter the completion of the object boundary information input, so that the final object boundary information may be transmitted to the server system.

Figure 34:
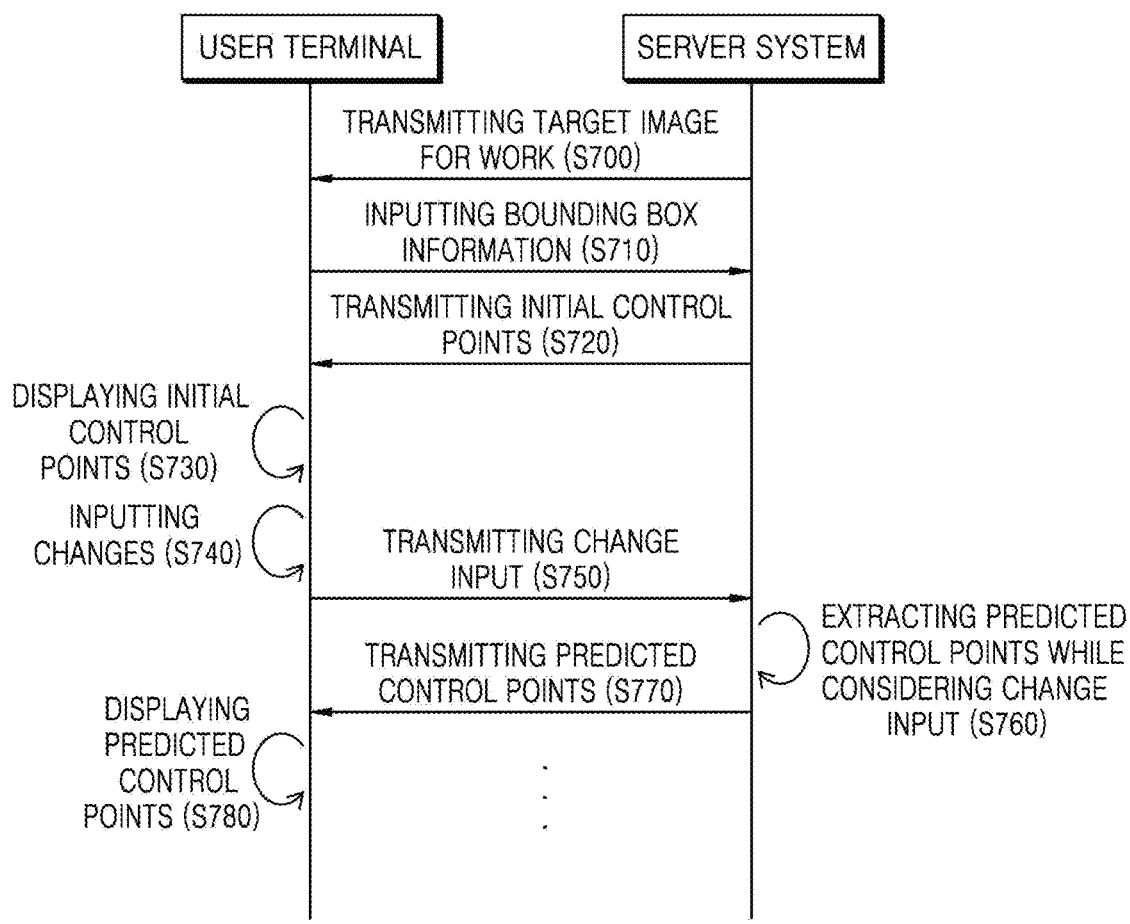
FIG. 34 schematically shows continuous execution steps of the method of inputting annotation of boundary information for the image according to another embodiment of the present invention.

FIG. 34 schematically shows continuous execution steps of the method of inputting annotation of boundary information for the image according to another embodiment of the present invention.

When the embodiment shown in FIG. 34 is compared with the embodiment shown in FIG. 33, initial control points having preset positions and shapes are transmitted to the user terminal first, the user terminal performs the change input, information about the predicted control points is derived in consideration of the change input, and then information about the predicted control points is transmitted to the user terminal.

Figure 35A:
FIGS. 35A and 35B show an example of a screen of the user terminal in the bounding information input step and the predicted control point display step according to one embodiment of the present invention.
Figure 35B:
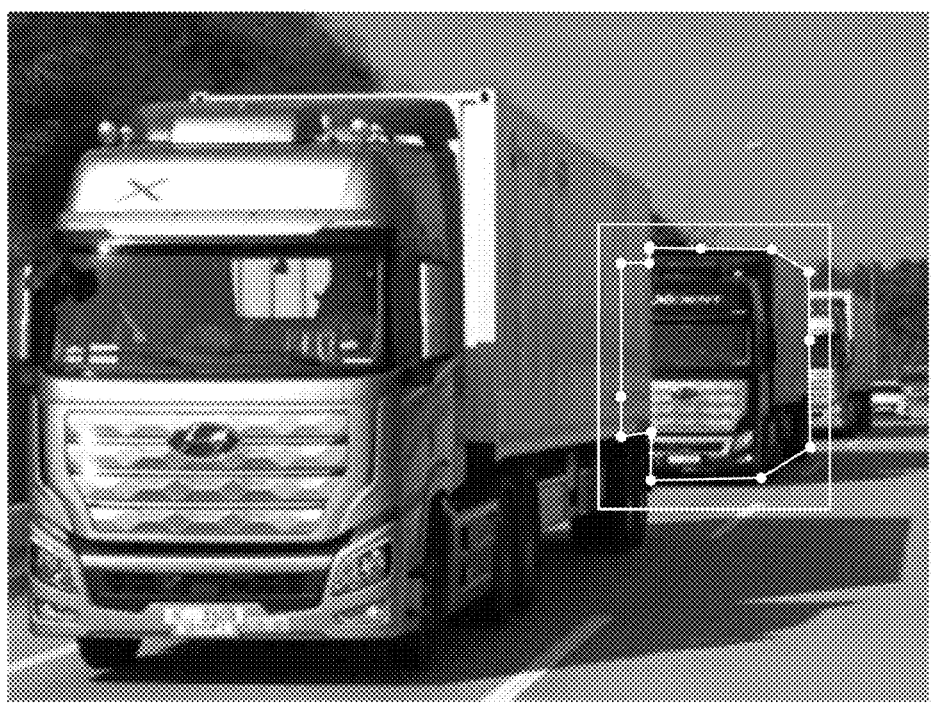

FIGS. 35A and 35B show an example of a screen of the user terminal in the bounding information input step and the predicted control point display step according to one embodiment of the present invention.

The image shown in FIG. 35(A) may correspond to the entire original image. The user may extract a target image area, which is the main object of the work, by using a tool such as a bounding box from the entire original image.

The extraction of the target image area not only can facilitate the user's work, but also can more accurately perform preliminary object extraction based on the artificial neural network.

FIG. 35(B) discloses that the preliminarily derived object boundary information are shown in the form of a plurality of control points and connection sequences according to the bounding box in the original image and the above-described method of deriving the object boundary information of the present invention. In one embodiment of the present invention, each control point may have connection sequences with two or more other control points, and the connection sequences may be implemented in the form of a line (a straight line or a curved line) between the control points.

In another embodiment of the present invention, only the area within the bounding box may be displayed in the step FIG. 35(B), that is, in the step after the bounding box information is inputted.

Figure 36A:
FIGS. 36A and 36B show an example of the screen of the user terminal during the change input reception step and after the second predicted control point extraction step according to one embodiment of the present invention.
Figure 36B:
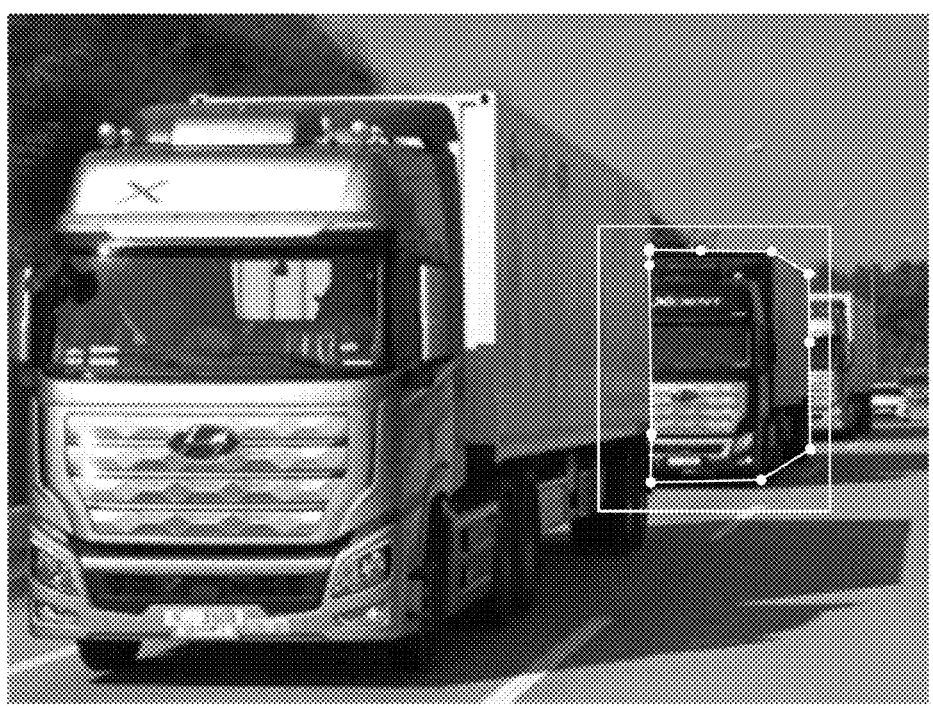

FIGS. 36A and 36B show an example of the screen of the user terminal during the change input reception step and after the second predicted control point extraction step according to one embodiment of the present invention.

FIG. 36(A) schematically shows a process of changing some positions of preliminarily derived control points according to a user's input. In FIG. 36(B), a position of one specific control point may be moved by dragging and dropping the specific control point with a mouse or touch-inputting the specific control point in a device having a touch display such as a smart phone.

FIG. 36(B) shows that, while considering the input in FIG. 36(A), the object boundary information is extracted again in the form of control points and connection sequences by using at least one artificial neural network module again and displayed to the user. Even on the above screen, the user may input modification of the control points or connection sequences.

In FIG. 36(A), because a part of the object is overlapped, the user moves any one of the overlapped control points, and the movement is applied by an inference model having at least one artificial neural network module to recalculate boundary information of the object again, thereby displaying the recalculated boundary information as shown in FIG. 36(B).

Figure 37A:
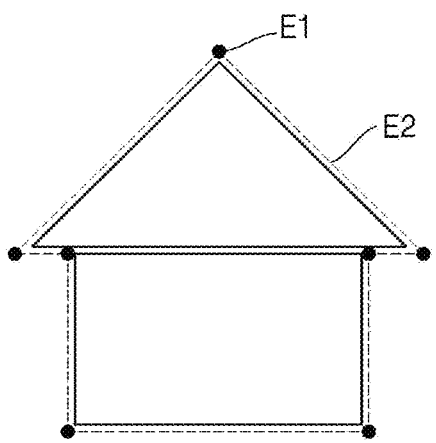
FIGS. 37A and 37B schematically show an example of a display screen in the predicted control point display step.
Figure 37B:
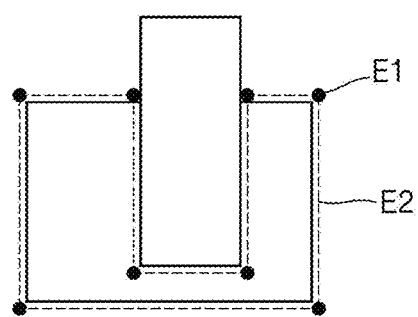

FIGS. 37A and 37B schematically show an example of a display screen in the predicted control point display step.

According to one embodiment of the present invention, the predicted control point display step includes: first display elements E1 indicating control points, respectively; and second display elements E2 for displaying sequences between the control points.

According to the present invention, since the object boundary information is displayed in the above polygonal form, the user may easily change the preliminarily calculated object boundary information even by moving some control points. In addition, since the artificial neural network module may accept the above user's change input in a normalized form and apply the change input to inference, the user may be assisted by at least one artificial neural network module by only moving some control points so that the annotation of the object boundary information may be efficiently performed within a short time.

Further, with regard to the derivation of preliminary object boundary information performed by the inference model including the artificial neural network, in the first prediction control point extraction step (S510) or the second prediction control point extraction step (S540) as shown in FIG. 37(B), when the object of the image inside the bounding box is obscured by another object, the connection sequences of the control points are changed by using the learned sequence adjustment artificial neural network model, such that the part obscured by another object is excluded from the object defined by the connection sequence of the control points.

Figure 38A:
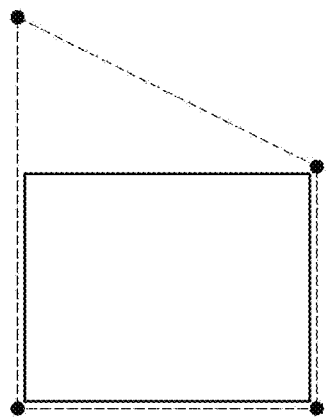
FIGS. 38A, 38B and 38C schematically show a change in the screen of the user terminal in the change input reception step.
Figure 38B:
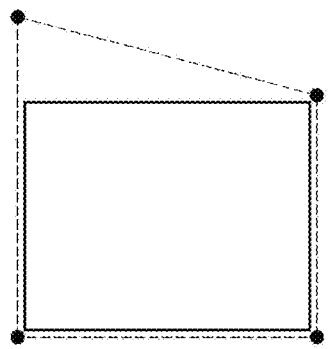
Figure 38C:
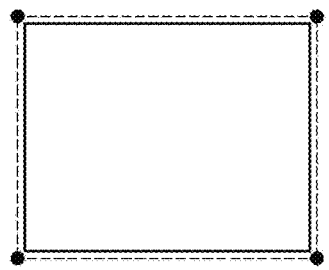

FIGS. 38A, 38B and 38C schematically show a change in the screen of the user terminal in the change input reception step.

In the change input reception step (S530), when a position of a specific control point is moved by the user input, the display elements (the dotted line connecting the control points in FIG. 38) for displaying the specific control point and sequences between other control points having a previous and next sequences are also changed and displayed according to the movement of the position of the specific control point.

In the above manner, the user may perform annotation work while checking changes of the overall object boundary information in real time according to the movement of the one control point by the user.

Figure 39:
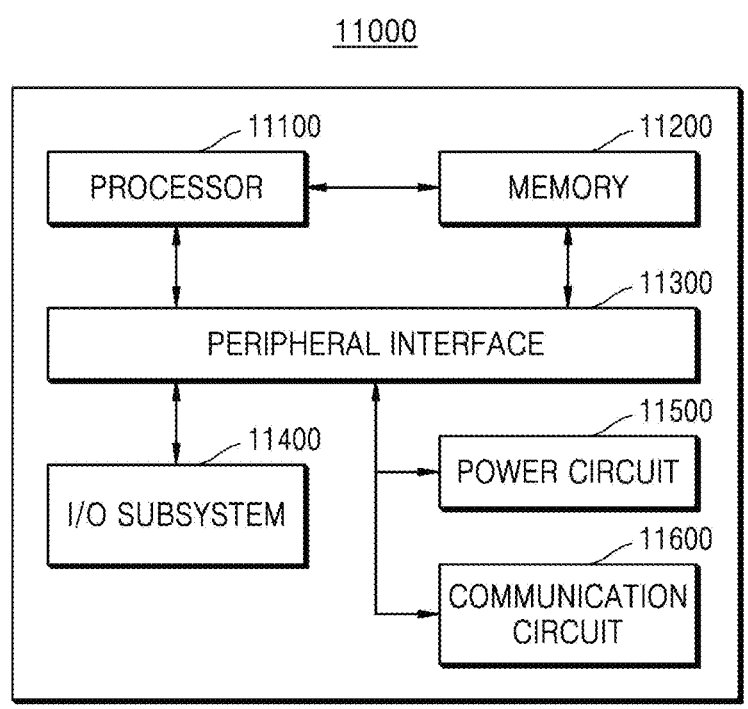
FIG. 39 exemplarily shows an internal configuration of a computing device according to one embodiment of the present invention.

FIG. 39 schematically shows internal components of the computing device according to one embodiment of the present invention.

As shown in FIG. 39, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing system 1000 shown in FIG. 1.

The memory 11200 may include for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300 may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a monitor, a keyboard, a mouse, a printer or a controller for coupling a peripheral device such as a touch screen or a sensor to the peripheral interface 11300 as needed. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or arbitrary other components for generating, managing, or distributing power.

The communication circuit 11600 uses at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The embodiment of FIG. 39 is merely an example of the computing device 11000, and the computing device 11000 may have a configuration or arrangement in which some components shown in FIG. 39 are omitted, additional components not shown in FIG. 39 are further provided, or at least two components are combined. For example, a computing device for a communication terminal in a mobile environment may further include a touch screen, a sensor, and the like in addition to the components shown in FIG. 39, and the communication circuit 11600 may include a circuit for RF communication of various communication schemes (such as WiFi, 3G, LTE, Bluetooth, NFC, and Zigbee). The components that may be included in the computing device 11000 may be implemented in hardware including at least one integrated circuit specialized in signal processing or application, software or a combination of hardware and software.

The methods according to the embodiments of the present invention may be implemented in the form of program instructions to be executed through various computing devices so as to be recorded in a computer-readable medium. In particular, the program according to the embodiment may be configured as a PC-based program or an application dedicated to a mobile terminal. The application to which the present invention is applied may be installed in the computing device 11000 through a file provided by a file distribution system. For example, the file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, in some cases, one processing device is used, however, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage media or device, or in a signal wave to be transmitted. The software may be distributed over computing devices connected to networks, so as to be stored or executed in a distributed manner. The software and data may be stored in at least one computer-readable recording media.

The method according to the embodiment may be implemented in the form of program instructions to be executed through various computing mechanisms so as to be recorded in a computer-readable medium. The computer-readable medium may include program instructions, data files, data structures, and the like, independently or in combination thereof. The program instructions recorded on the medium may be specially designed and configured for the embodiment, or may be known by those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above-described hardware device may be configured to operate as at least one software module to perform the operations of the embodiments, and vise versa.

The above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved. Therefore, other implementations, other embodiments, and equivalents to the claims are also within the scope of the following claims.

What is claimed is:

1. A method, which is executed in a computing system including at least one processor and at least one memory, of inputting annotation of object boundary information, the method comprising:
   a bounding information input step of receiving information on a bounding box inside a general image from a user;
   a first prediction control point extraction step of extracting a plurality of control points related to a predicted object boundary from a target image inside the bounding box by using a learned artificial neural network model
   a predicted control point display step of overlaying and displaying the predicted control points on the target image inside the bounding box in a form of having reciprocal connection sequences; and
   a change input reception step of receiving a position change input for at least one of the control points from the user, wherein when the target image is partially hidden by another image inside the bounding box, the method further comprises:
   adjusting the control points to outermost points contouring a single boundary surrounding a specific shape containing the target image and the partially hidden region of the target image;
   extracting feature map information corresponding to each of the outermost points of the specific shape;
   determining dependencies between the outermost points based on the extracted feature map information using a pre-trained artificial neural network model;
   identifying the partially hidden region by comparing a value representing a degree of dependency between the outermost points to a predefined threshold, where the value between the outermost points surrounding the hidden region of the target image is less than the threshold;
   removing the partially hidden region from the specific shape by disconnecting connections between the outmost points surrounding the hidden region; and
   inferring a boundary of the target image based on boundaries of identified regions of the specific shape segmented by removing the partially hidden region.

2. The method of claim 1, further comprising:
   a second prediction control point extraction step of extracting a plurality of control points related to the predicted object boundary from the target image inside the bounding box by using a learned artificial neural network model, while additionally considering the position change input.

3. The method of claim 1, wherein the first predicted control point extraction step includes:
   deriving relational information between the control points by a sequence adjustment artificial neural network module based on detailed information of the feature map information corresponding to the positions of the control points; and
   changing the connection sequences of the control points based on the relationship information.

4. The method of claim 1, wherein the predicted control point display step includes:
   first display elements indicating control points, respectively; and
   second display elements for displaying sequences between the control points.

5. The of claim 1, wherein the change input reception step includes:
   allowing the display elements for displaying a specific control point and sequences between other control points having a previous and next sequences to be also changed and displayed according to a movement of a position of the specific control point, when the position of the specific control point is moved by the user input.

6. A computing system including at least one processor and at least one memory to input annotation of object boundary information for an image, the computing system performing:
   a bounding information input step of receiving information on a bounding box inside a general image from a user;
   a first prediction control point extraction step of extracting a plurality of control points related to a predicted object boundary from a target image inside the bounding box by using a learned artificial neural network model;
   a predicted control point display step of overlaying and displaying the predicted control points on the image inside the bounding box in a form of having reciprocal connection sequences; and
   a change input reception step of receiving a position change input for at least one of the control points from the user, wherein when the target image is partially hidden by another image inside the bounding box, the computing system further performing:
   adjusting the control points to outermost points contouring a single boundary surrounding a specific shape containing the target image and the partially hidden region of the target image;
   extracting feature map information corresponding to each of the outermost points of the specific shape;

determining dependencies between the outermost points based on the extracted feature map information using a pre-trained artificial neural network model;

identifying the partially hidden region by comparing a value representing a degree of dependency between the outermost points to a predefined threshold, where the value between the outermost points surrounding the hidden region of the target image is less than the threshold;

removing the partially hidden region from the specific shape by disconnecting connections between the outmost points surrounding the hidden region; and inferring a boundary of the target image based on boundaries of identified regions of the specific shape segmented by removing the partially hidden region.

7. A non-transitory computer-readable medium storing a computer program including a plurality of instructions executed by at least one processor, the computer program comprising:

a bounding information input step of receiving information on a bounding box inside a general image from a user;

a first prediction control point extraction step of extracting a plurality of control points related to a predicted object boundary from an image inside the bounding box by using a learned artificial neural network model;

a predicted control point display step of overlaying and displaying the predicted control points on the image inside the bounding box in a form of having reciprocal connection sequences; and a change input reception step of receiving a position change input for at least one of the control points from the user, wherein when the target image is partially hidden by another image inside the bounding box, the computer program further comprising:

adjusting the control points to outermost points contouring a single boundary surrounding a specific shape containing the target image and the partially hidden region of the target image;

extracting feature map information corresponding to each of the outermost points of the specific shape;

determining dependencies between the outermost points based on the extracted feature map information using a pre-trained artificial neural network model;

identifying the partially hidden region by comparing a value representing a degree of dependency between the outermost points to a predefined threshold, where the value between the outermost points surrounding the hidden region of the target image is less than the threshold;

removing the partially hidden region from the specific shape by disconnecting connections between the outmost points surrounding the hidden region; and inferring a boundary of the target image based on boundaries of identified regions of the specific shape segmented by removing the partially hidden region.

* * * * *